(12) United States Patent
Somlai-Fisher et al.

(10) Patent No.: US 9,703,446 B2
(45) Date of Patent: Jul. 11, 2017

(54) ZOOMING USER INTERFACE FRAMES EMBEDDED IMAGE FRAME SEQUENCE

(71) Applicant: Prezi, Inc., San Francisco, CA (US)

(72) Inventors: Ádám Somlai-Fisher, Budapest (HU); Zsuzsa Weiner, Budapest (HU); Gabor Papp, Budapest (HU); Bence Samu, Budapest (HU); Agoston Nagy, Budapest (HU); Laszlo Laufer, Budapest (HU)

(73) Assignee: Prezi, Inc., San Francisco, CA (US)

( * ) Notice: Subject to any disclaimer, the term of this patent is extended or adjusted under 35 U.S.C. 154(b) by 290 days.

(21) Appl. No.: 14/535,482

(22) Filed: Nov. 7, 2014

(65) Prior Publication Data

US 2015/0248198 A1     Sep. 3, 2015

Related U.S. Application Data

(60) Provisional application No. 61/946,067, filed on Feb. 28, 2014.

(51) Int. Cl.
| | | |
|---|---|---|
| *H04N 5/93* | (2006.01) | |
| *G11B 27/00* | (2006.01) | |
| *H04N 9/80* | (2006.01) | |
| *G06F 3/0481* | (2013.01) | |
| *G06F 1/16* | (2006.01) | |
| *H04N 5/783* | (2006.01) | |

(52) U.S. Cl.
CPC .......... *G06F 3/0481* (2013.01); *G06F 1/1694* (2013.01); *G06F 2203/04806* (2013.01)

(58) Field of Classification Search
CPC . H04N 5/783; H04N 5/93; H04N 9/80; G11B 27/00
USPC ....... 386/343, 345, 347, 278, 282, 280, 239, 386/248
See application file for complete search history.

(56) References Cited

U.S. PATENT DOCUMENTS

| | | | |
|---|---|---|---|
| 7,707,503 B2 | 4/2010 | Good et al. | |
| 2002/0078144 A1* | 6/2002 | Lamkin ............. | G06F 17/30017 709/203 |
| 2002/0082915 A1 | 6/2002 | Reiffel et al. | |
| 2002/0090201 A1* | 7/2002 | Betz ..................... | G11B 27/105 386/242 |
| 2003/0222145 A1 | 12/2003 | Reiffel | |
| 2005/0259164 A1* | 11/2005 | Kudo ................... | G11B 27/034 348/231.2 |
| 2006/0140600 A1* | 6/2006 | Suda .................. | H04N 5/23248 396/52 |

(Continued)

OTHER PUBLICATIONS

"Telestrator Invention Wins Emmy Just In Time For Super Bowel", [Online]. Retrieved from the Internet: <URL: http://www.prweb.com/releases/2005/2/prweb205940.htm, (2005), 2 pgs.

(Continued)

*Primary Examiner* — Daquan Zhao
(74) *Attorney, Agent, or Firm* — Schwegman Lundberg & Woessner, P.A.

(57) ABSTRACT

A method is provided to display an image frame sequence comprising: displaying an image frame sequence on a display screen; and in the course of displaying the image frame sequence, displaying a zooming user interface (ZUI) frame sequence on the display screen.

21 Claims, 21 Drawing Sheets

(56) References Cited

U.S. PATENT DOCUMENTS

| | | | |
|---|---|---|---|
| 2007/0085928 A1* | 4/2007 | Sloot | H04N 5/44513 348/468 |
| 2007/0132763 A1* | 6/2007 | Chu | G01B 11/24 345/442 |
| 2008/0107403 A1* | 5/2008 | Urano | H04N 5/93 386/263 |
| 2009/0128580 A1 | 5/2009 | Meier et al. | |
| 2009/0265632 A1 | 10/2009 | Russ et al. | |
| 2015/0042682 A1* | 2/2015 | Jensen | H04N 21/812 345/634 |
| 2015/0194187 A1 | 7/2015 | Cleven et al. | |
| 2015/0350737 A1 | 12/2015 | Anderson et al. | |

OTHER PUBLICATIONS

Oakes, Chris, "John Madden on Gridiron Tech", [Online]. Retrieved from the Internet: <URL: http://archive.wired.com/science/discoveries/news/1999/01/17481, (Jan. 22, 1999), 5 pgs.

\* cited by examiner

ZOOMING USER INTERFACE FRAMES EMBEDDED IMAGE FRAME SEQUENCE

CROSS-REFERENCE TO RELATED APPLICATION

This application claims the benefit and priority under 35 U.S.C. 119(e) to commonly owned U.S. provisional patent application Ser. No. 61/946,067, filed Feb. 28, 2014, entitled, "ZUI Slides Embedded in Video Frames and Move Matched to Camera Viewpoint Movement in Multiple Degrees of Freedom", which is expressly incorporated herein by this reference.

BACKGROUND

A zooming user interface (ZUI) is a type of graphical user interface (GUI) in which the scale of a viewed area is changed in order to view more detail or less, and to browse through and among different visual display elements such as images, shapes, documents, or videos. Display elements may be added to a workspace referred to as a 'canvas' to create a zoomable presentation in which details and subtopics can be presented through zooming in and out to reveal more or less detail. Typically, the canvas is larger than a viewing window generated on a device display screen, and a user can scroll a viewing window to view different display elements disposed on different regions of the canvas. The ZUI differs from a normal canvas in that the user may zoom in or out onto a particular display element. Display elements can be inserted anywhere among the presentation content. Users can pan across the canvas in two dimensions (in 2D) and zoom into objects of interest. Display elements present inside a zoomed region can in turn be zoomed themselves to reveal additional detail, allowing for recursive nesting and an arbitrary level of zoom. For example, as a user zooms into a text object, the text may be represented initially as a small dot, then as a thumbnail image, next as a complete page and finally as a magnified view of a portion of the page focused on a key passage from the text. Thus, ZUIs use zooming as the primary metaphor for browsing through multivariate or hyperlinked information, for example.

FIGS. 1A-1C are illustrative drawings showing three different portions of a canvas at three different zoom levels viewed through a viewing window. FIG. 1A shows a viewing window 3 through which portions of display elements 4 and 6 disposed on a canvas 2 are visible but in which display elements 8-14 on the canvas 2 are not visible. The four arrows in FIG. 1A indicate the ability to move the viewing window so as to pan across the canvas 2. FIG. 1B shows a zoomed out view of the same canvas 2 in which display elements 4-14 are visible through the viewing window 3. FIG. 1C shows a zoomed in view of display element 6 on the same canvas 2 through the viewing window 3.

FIG. 2 is an illustrative drawing representing a ZUI that includes multiple image layers located at respective planes useful to generate a 3D effect according to some embodiments. The canvas is represented as a canvas layer 220, the canvas layer 220 located in a canvas (imaging) plane. One or more additional backgrounds layers are located in respective background (imaging) planes. More particularly, in the example in FIG. 2, the canvas layer 220 is shown including display elements 230, 232, and 234. Display element 230 comprises a topmost background layer 224. Display element 232 comprises a middle background layer 226. Display element 234 comprises a bottom background layer 228. As an example, when the zoom level is appropriate for the display element 234 to occupy most or all of the viewing window area, the background content contribution from the background layers 222 may be as follows: 0% from topmost background layer 224, 20% from middle background layer 226, and 80% from bottom background layer 228. The gradual transitioning between background layers or the mixture of relevant background layers is achieved with different opacity levels for respective background layers.

In addition to matching up certain background layer(s) as the "dominant" background layer(s) to a given display element of the canvas layer 220 in accordance with the size of the display element relative to the size of all the other display elements, determining which image portion/area/region of the "dominant" background layer(s) (also referred to as the background crop) to display with the given display element is based on the given display element's relative position in the current bounding box of the canvas (active canvas area). As shown in FIG. 5B, the display element 230 is positioned in the bottom left region of the overall active canvas area. A background crop 240 correspondingly comes from the bottom left region of the "dominant" top background layer 224. The display element 232 positioned in the top middle region of the overall active canvas area, means that a background crop 232 in the "dominant" middle background layer 226 is taken from the top middle region of the middle background layer 226. The region of the bottom background layer 228 for a background crop 244 for the display element 234 is similarly determined. Also note that the size of background crop 240 is larger than background crop 242, and background crop 242 is larger than background crop 244, corresponding to the size differential among its respective display elements 230, 232, 234.

Once a given background crop is rendered with its display element, to maintain the parallax effect, the amount of horizontal (x-axis direction) or vertical (y-axis direction) motion is relaxed for the background layer(s) compared to the amount of such motion on the canvas layer. For example, if a user pans or moves along the canvas 100 units to the right, the background crop of the "dominant" background layer(s) is taken from 10 units to the right of the previous background crop location on the "dominant" background layer(s) instead of 100 units to the right as in the canvas.

Renderings 250, 252, and 254 shown in FIG. 2 comprise content displayed in the viewing window (e.g., main area 220 of FIG. 2) when the zoom level and pan position are set to display all of each of display elements 230, 232, 234, respectively, within the respective viewing window. Rendering 250 shows display element 230 displayed with background crop 240. Rendering 252 shows display element 232 displayed with background crop 242. Rendering 254 shows display element 234 displayed with background crop 244. Alternatively, renderings 250, 252, 254 can comprise thumbnails or snapshots of certain area or content of the presentation at certain zoom level that are generated by the user FIG. 2. An example multiple layer ZUI is further described in commonly owned pending patent application Ser. No. 12/467,702, entitled, 3D RENDERING IN A ZUI ENVIRONMENT, filed May 31, 2013, which is expressly incorporated herein in its entirety by this reference.

SUMMARY

In one aspect, a method is provided to display an image frame sequence. An image frame sequence is displayed on a display screen. In the course of displaying the image frame sequence, a zooming user interface (ZUI) content frame sequence is displayed on the display screen.

DESCRIPTION OF EMBODIMENTS

Figure 1A:
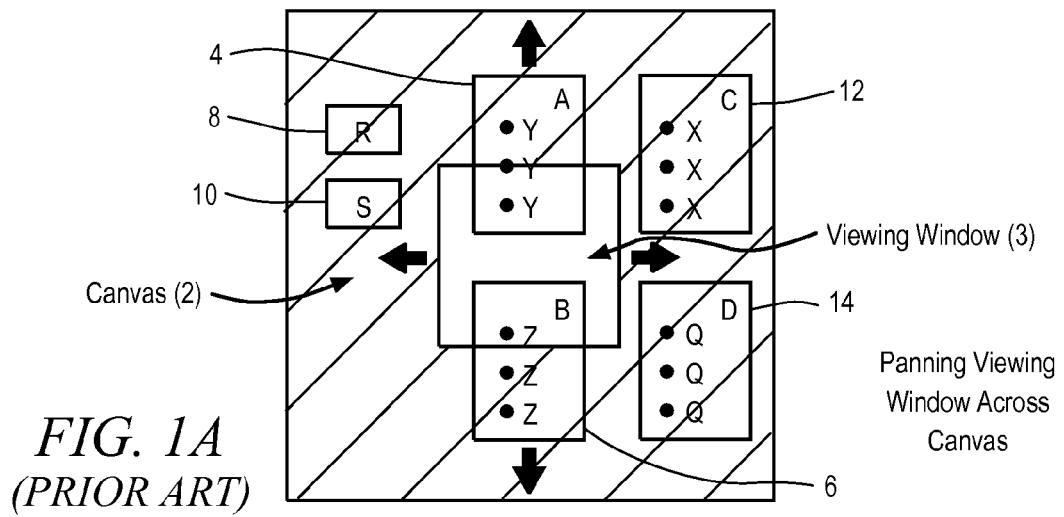
FIGS. 1A-1C are an illustrative drawings showing three different portions of a canvas at three different zoom levels viewed through a viewing window.
Figure 1B:
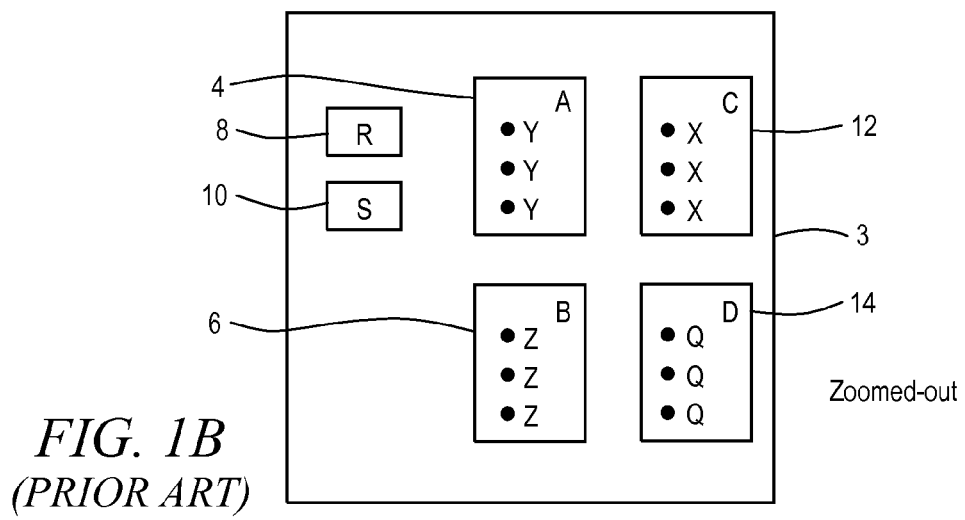
Figure 1C:
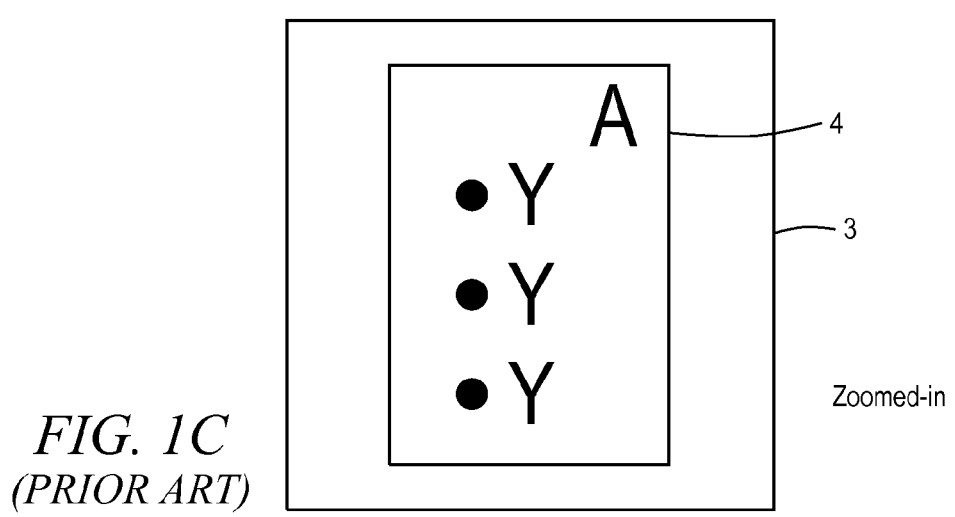
Figure 2:
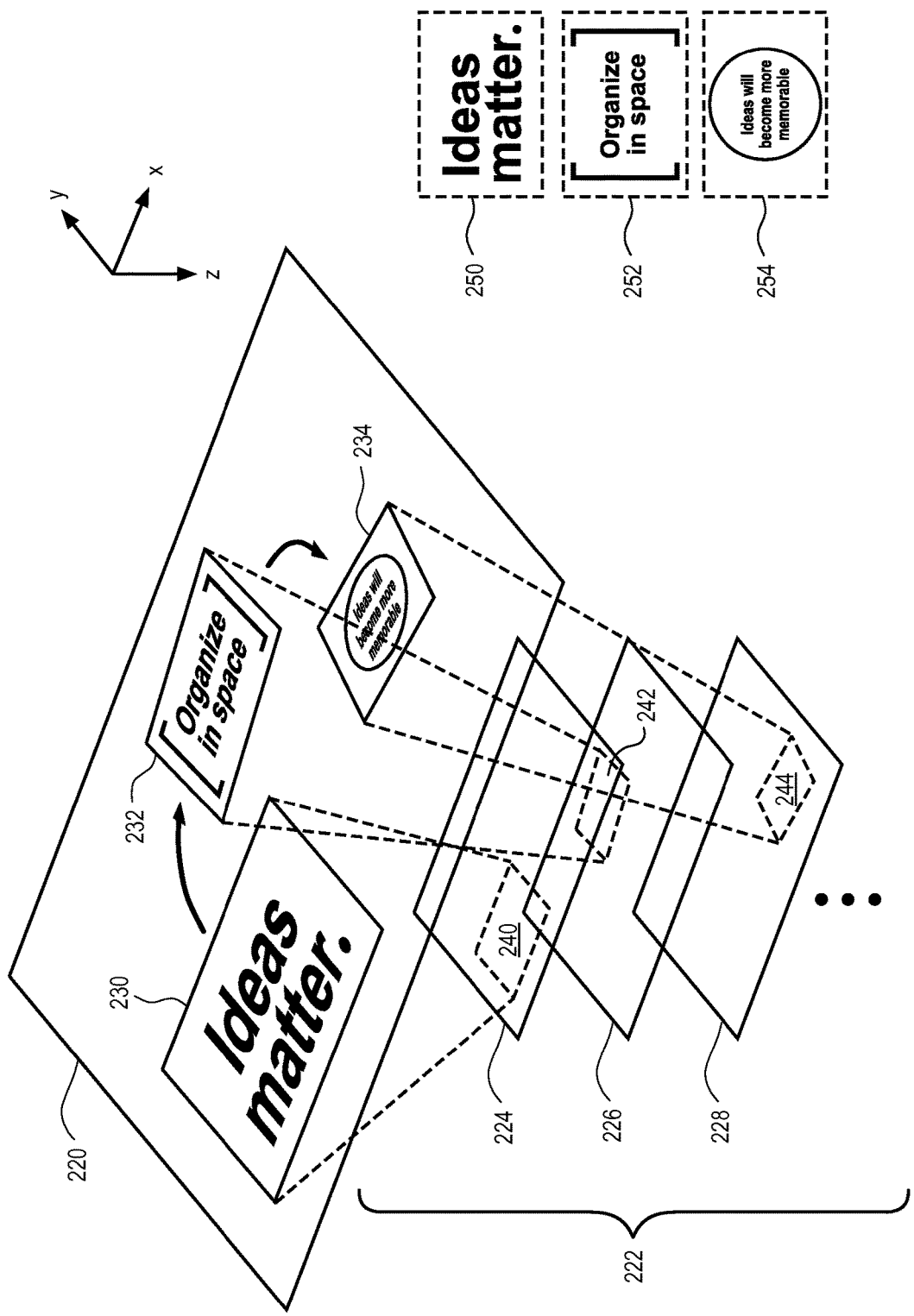
FIG. 2 is an illustrative drawing representing a ZUI that includes multiple image layers located at respective planes useful to generate a 3D effect.

The following description is presented to enable any person skilled in the art to configure a computer system and related method and article of manufacture to insert ZUI frames in a captured video sequence. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and processes are shown in block diagram form in order not to obscure the description of the invention with unnecessary detail. Identical reference numerals may be used to represent different views of the same or substantially the same item in different drawings. Flow diagrams in drawings referenced below are used to represent processes. A computer system is configured to perform these processes. The flow diagrams include modules that represent the configuration of a computer system according to computer program code to perform the acts described with reference to these modules. Thus, the present invention is not intended to be limited to the embodiments shown, but is to be accorded the widest scope consistent with the principles and features disclosed herein.

INTRODUCTION

Figure 3:
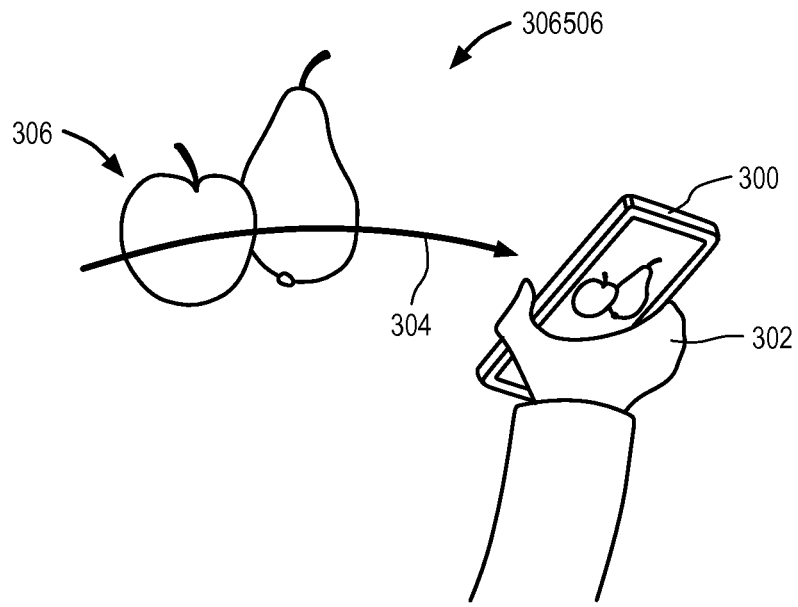
FIG. 3 is an illustrative drawing representing movement of a camera, along a curved path as the camera captures a video image of objects in accordance with some embodiments.

FIG. 3 is an illustrative drawing representing movement of a camera 300, which may be a component of a mobile device such as a smartphone (or other device), for example, held by hand 302 along a curved path indicated by arrow 304 as the camera captures a video image of objects 306, an apple and a pear in this example, from the physical world. It will be appreciated that capturing image information in this manner produces a sequence of frames that portrays the objects 306 from different perspective viewpoints as the camera viewpoint changes as it is moved along the path 304.

Figure 4:
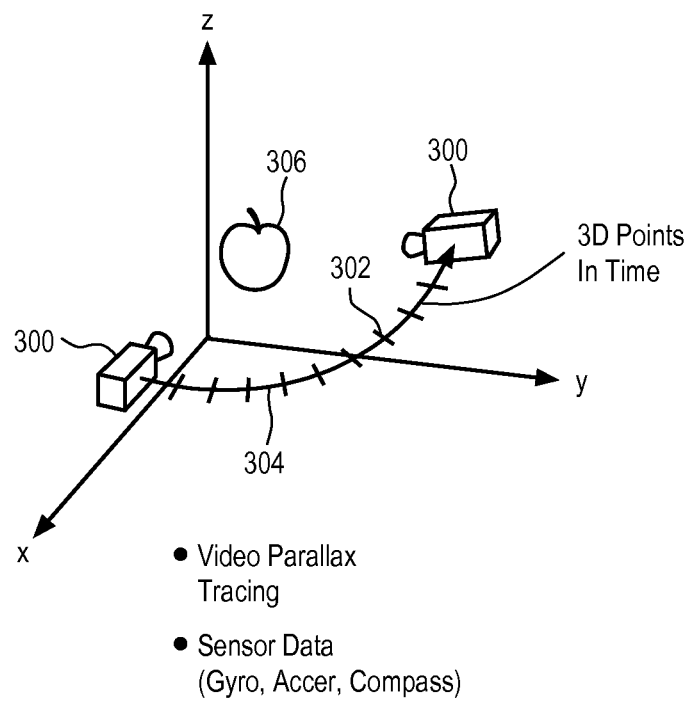
FIG. 4 is another illustrative drawing from a different perspective representing movement of the video camera of FIG. 3 along the same path in accordance with some embodiments.

FIG. 4 is another illustrative drawing from a different perspective representing movement of the video camera 300 (the drawing shows multiple locations of just one camera) along the same path 304. The view of FIG. 4 represents parallax tracking of the objects 306 relative to (x, y, z) axes of a physical world in which the objects 306 are located. Each hash-mark 602 along the path 504 represents a hypothetical location at which a ZUI frame sequence later may be inserted into a sequence of video frames that are created during capture of the video image. As the camera moves along the path 504 during image capture, sensors such as accelerometers, gyroscopes and compass may track the motion of the camera, in six degrees of freedom, for example. The camera tracking information, which may be recorded, indicates changes in viewing angle of the camera 300 relative to orientation of the 3D physical world.

The tracking information also may indicate an amount and severity of shaking of the camera during image capture. For example, a short series of rapid changes in camera direction of movement can indicate severe camera shaking. In accordance with some embodiments, an indication can be stored in a non-transitory storage device that correlates tracking information with recorded frames so that a determination can be made as to which frames were recorded while the camera was shaking. Camera shaking during recording can result in recorded frames being difficult for a viewer to comprehend, for example.

Figure 5:
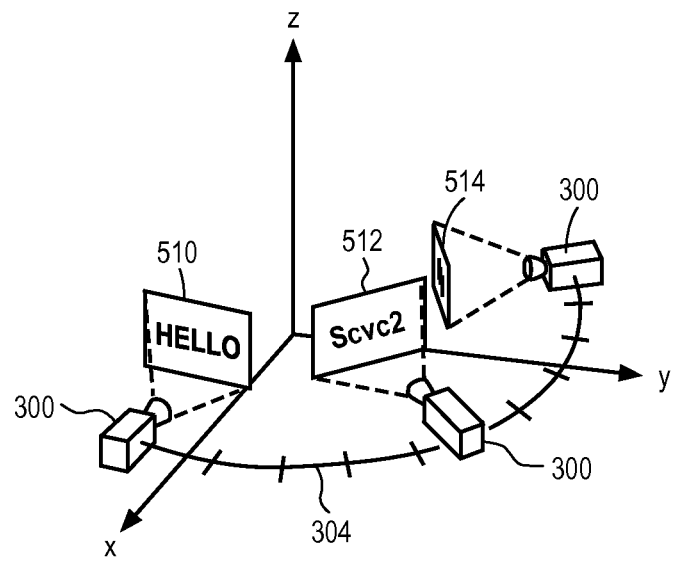
FIG. 5 is yet another illustrative drawing from the same perspective as FIG. 4 showing physical position along the path and orientation of the camera corresponding to captured image frames on which illustrative ZUI sequences are overlaid in accordance with some embodiments.

FIG. 5 is yet another illustrative drawing from the same perspective as FIG. 4, again representing the movement of the position of camera 300 along the path 304 during image capture, but this time showing physical position along the path 304 and orientation of the camera 300 corresponding to captured image frames on which illustrative ZUI frames 510, 512, 514 overlaid on frames captured along the path 304. It will be appreciated that, in accordance with some embodiments, each of the ZUI frames 510, 512, 514 may be one frame of three different ZUI frame sequences. In accordance with some embodiments, that each of the ZUI frames 510, 512, 514 may be one frame of three different ZUI frame sequences. It can be seen that at each position on the path 304 at which a ZUI frame is inserted, the ZUI frame is disposed within the same camera field of view used by the camera to capture the video frame on which it is overlaid. Moreover, at each position on the path at which a ZUI frame is inserted, the ZUI frame is aligned parallel to the video frame captured by the camera 300 at that location on the path 304. Since the path 304 is curved, different ZUI frames are disposed at different orientations relative to each other and relative to the physical world. As explained more fully below, in accordance with some embodiments, this orientation of ZUI frames relative to each other and relative to the captured frames' perspectives of the physical world is achieved through a match moving process that create the impression to a user that the ZUI frames are disposed in a 3D relationship to objects in the captured video frame sequence.

Figure 6:
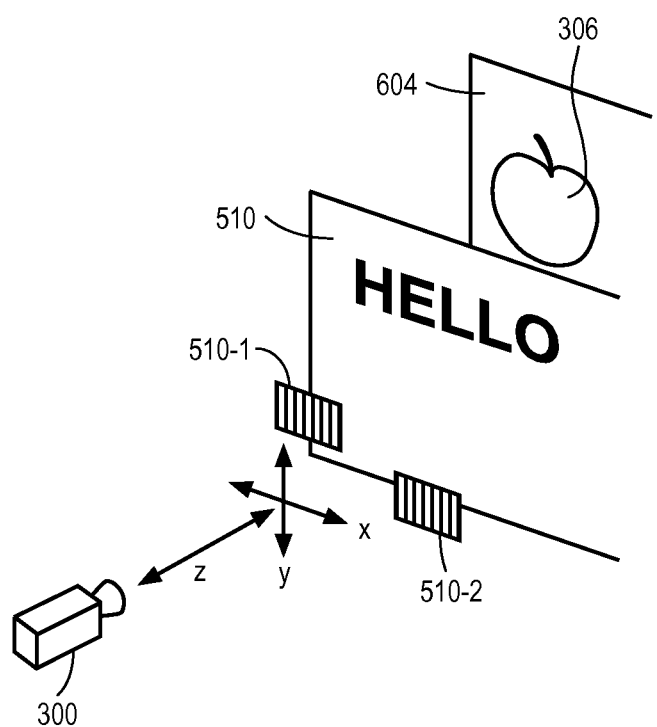
FIG. 6 is an illustrative drawing representing a perspective viewpoint of the camera of FIGS. 3-5 relative to an image of the objects captured within an example individual video frame that is overlaid by the example ZUI sequence in accordance with some embodiments.

FIG. 6 is an illustrative drawing representing a perspective viewpoint of the camera 300 relative to an image of the objects 306 captured within an example individual video frame 610 that is overlaid by the example ZUI frame 410. An (x, y, z) coordinate system associated with the example ZUI frame 510 is provided to show the relative position and orientation of the camera 300 relative to the sequence. The example ZUI frame 510 encompasses multiple layers. It includes a layer with the word "Hello". The example ZUI frame 510 also includes a layer containing example shaded regions 510-1, 510-2, in the foreground, closer to the camera 300 than is the layer with the word "Hello". It will be appreciated that additional layers of planar ZUI content (not shown) can be disposed behind the word "Hello". The captured video frame on which the example ZUI sequence is overlaid acts as a background layer of the ZUI frame 510 disposed furthest from the position of the camera 300.

Variable Playback Speed for ZUI Sequences Overlaid on a Video Frame Sequence

Figure 7:
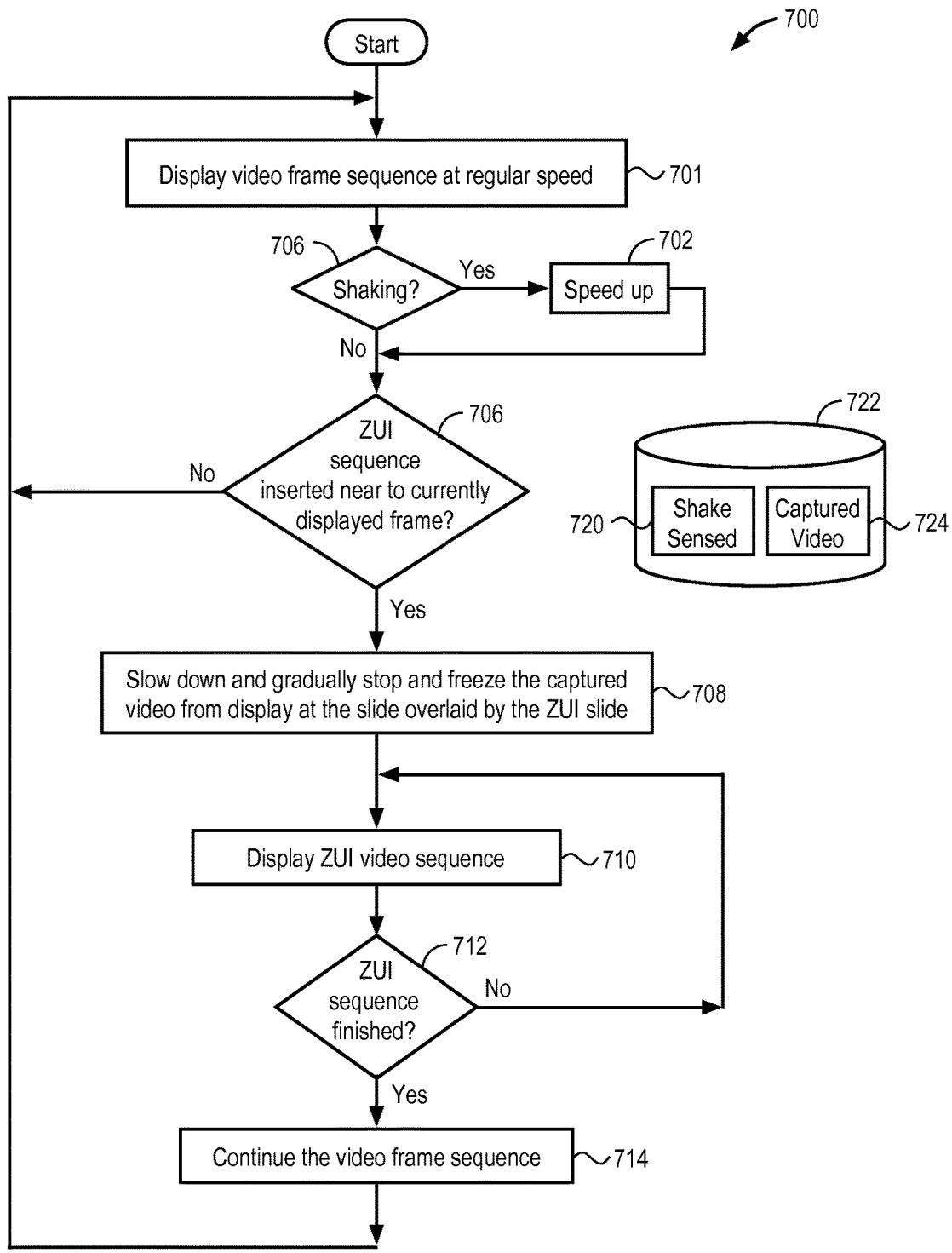
FIG. 7 is an illustrative flow diagram representing a process to control playback of a captured video frame sequence in which a ZUI sequence is inserted in accordance with some embodiments.

FIG. 7 is an illustrative flow diagram representing a process 700 to control playback of a captured video frame sequence into which a ZUI frame sequence is inserted, in accordance with some embodiments. Module 701 configures a device such as a smartphone, media player, Personal Digital Assistant (PDA), cellular telephone, web appliance, computer, laptop computer or tablet computing device, for example, to display a captured video frame sequence at normal speed. Decision module 702 determines whether shake sensed information 720 stored in a computer readable storage device 722 in association with the captured video sequence 724 indicates that the camera 300 was shaking at the time of capture of one or more portions of a captured video sequence that is about to be displayed. A device used to record the captured sequence may include motion sensors, such as accelerometers, that can detect and record shaking, for example. Decision module 702 refers to the stored information 720, 724 indicating amount of shaking during capture to determine whether the amount of shaking exceeded some prescribed threshold for one or more portions of the captured video sequence. In accordance with some embodiments, a shaking threshold can be set based upon number and rapidity in changes in acceleration of the camera 300 during image capture. In response to a determination that the camera shaking at the time of capture exceeded the prescribed threshold, module 704 speeds up playback of the portions of the captured video sequence that were captured while shaking exceeded the threshold. It will be appreciated that speeding up the shaky portions of the video can improve the appearance of playback to users since the shaky portions are run through rapidly and so the shaking may not be as noticeable to users. Control next flows to decision module 706. Alternatively, in response to a determination that the camera shaking at the time of capture did not exceed the prescribed threshold, control also flows to decision module 706.

Decision module 706 configures the device to determine whether a ZUI sequences is inserted nearby to a frame that soon is to be displayed. Module 708 configures the device to slow down and to gradually halt the captured video frame sequence at a selected captured frame where a ZUI frame sequence is inserted. Module 710 configures the device to display the inserted ZUI sequence with the selected captured frame acting as a background image. Decision module 712 monitors ZUI display to determine whether it is completed. If not, then the captured frame sequence remains halted and the ZUI sequence continues to play. In response to completion of the ZUI sequence, the module 714 causes the captured frame sequence to gradually speed up and to continue playback at the normal playback speed. Control flows back to module 701.

Figure 8:
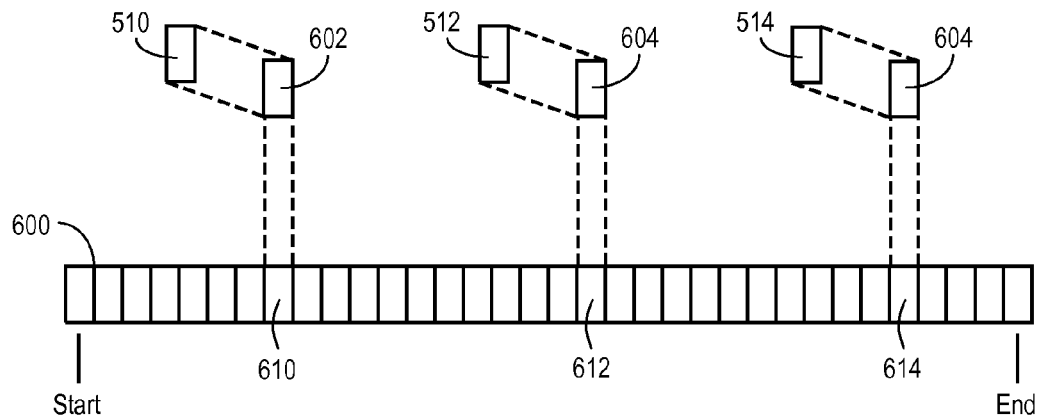
FIG. 8 is a conceptual representation of a linear sequence of captured video frames in which a ZUI sequences inserted in accordance with some embodiments.

FIG. 8 is a conceptual representation of a linear sequence of captured video frames 600, starting with a "start" frame and ending with an "end" frame in which the video frames 610, 612 and 614 have ZUI frames 510, 512, 514, and corresponding ZUI sequences (not shown) overlaid onto them as indicated by the dashed lines. The captured video frame sequence 600 may be captured as the camera 300 follows path 304, in FIGS. 3-5, for example. Frame 610 occurs in time and sequence in the sequence of video frames before frames 612 and 614. Frame 612 occurs in time and sequence in the sequence of video frames between the occurrence of frames 610 and 614.

Figure 9:
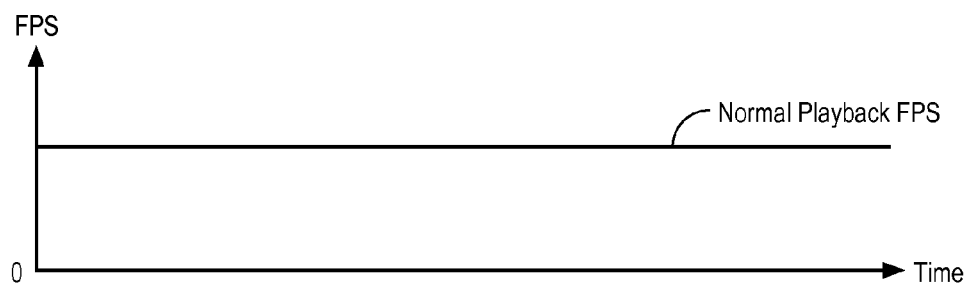
FIG. 9 is an illustrative drawing representing rate of play back in frames-per-second (FPS) of a typical sequence of captured frames during normal playback in accordance with some embodiments.

FIG. 9 is an illustrative drawing representing rate of play back in frames-per-second (FPS) of a typical sequence of captured frames during normal playback. It can be seen that playback normally occurs at a constant FPS rate throughout the playback. In accordance with some embodiments, normal playback speed is approximately 24-60 fps. However, alternatively, the playback rate can be defined to match the fps rate used to record the video, for example.

Figure 10:
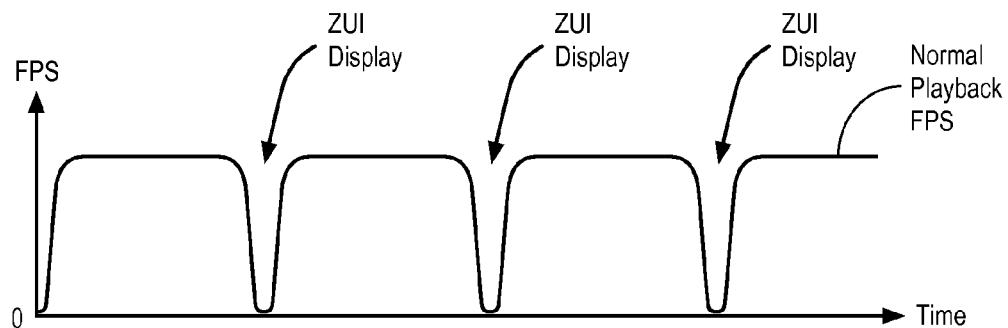
FIG. 10 is an illustrative drawing representing rate of play back in frames-per-second of the sequence of captured video frames of FIG. 8 with overlaid ZUI sequences in accordance with some embodiments.

FIG. 10 is an illustrative drawing representing rate of play back in frames-per-second of the sequence of captured video frames 600 of FIG. 8 with overlaid ZUI sequences in accordance with some embodiments. It can be seen that the playback occurs at the normal FPS rate except for captured frames nearby to captured frames 610, 612 and 614 on which ZUI sequence 510, 512, 514 have been inserted for zooming. In accordance with some embodiments, prior to display of the ZUI frame sequences, the playback rate of captured frame sequence 600 gradually slows and then halts. Whereupon, a sequence of ZUI video frames may be displayed that portray zooming and panning within the ZUI sequence. In other words, the ZUI sequence may include zooming in and out of and panning across visual display elements displayed on a ZUI canvas, for example. After a ZUI sequence is complete, the captured video sequence 600 resumes and gradually increases to its normal rate of play until a next video frame overlaid with a ZUI sequence is arrived at.

ZUI Sequence Creation

Figure 11:
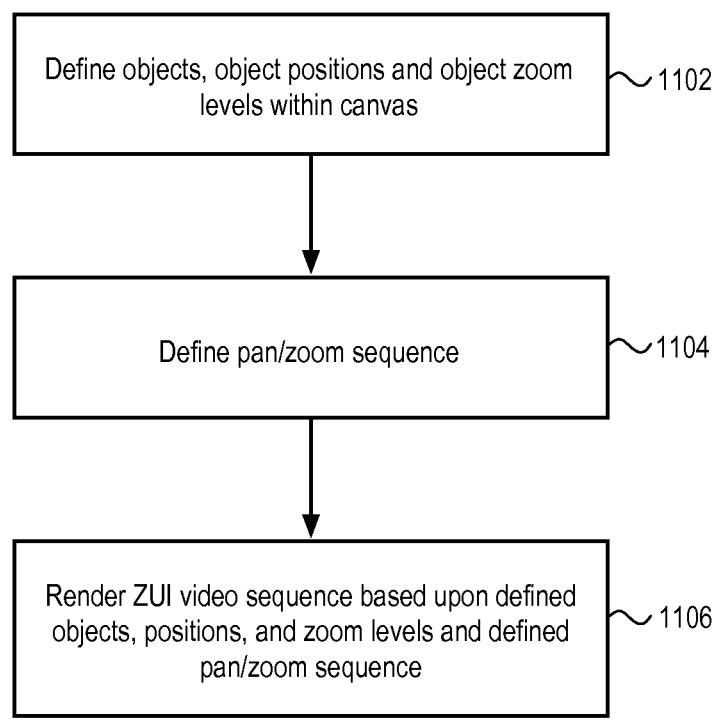
FIG. 11 is an illustrative drawing representing a process in which a user creates a ZUI video frame sequence in accordance with some embodiments.

FIG. 11 is an illustrative drawing representing a process in which a user creates a ZUI video frame sequence in accordance with some embodiments. In block, 1102, a user defines visual display elements, visual display element (z, y) positions and zoom levels (Z) on a canvas. In block, 1104, a user defines a zoom sequence. In block, 1106, a ZUI video frame sequence is produced that can be used to generate a ZUI video display that includes zooming and panning across the defined display elements. Commonly assigned U.S. patent application Ser. No. 14/179,345, 2014, entitled, ADDING NEW SLIDES ON A CANVAS IN A ZOOMING USER INTERFACE, filed February 12; U.S. patent application Ser. No. 14/051,303, entitled, NAVIGATION WITH SLIDES IN A ZOOMING USER INTERFACE, filed Oct. 10, 2013; and U.S. patent application Ser. No. 13/853,008, 2014, entitled, AUTOMATIC APPLICATION OF TEMPLATES TO CONTENT, filed Mar. 28, 2013, which described processes to create a ZUI display, are expressly incorporated herein by this reference.

Figure 12:
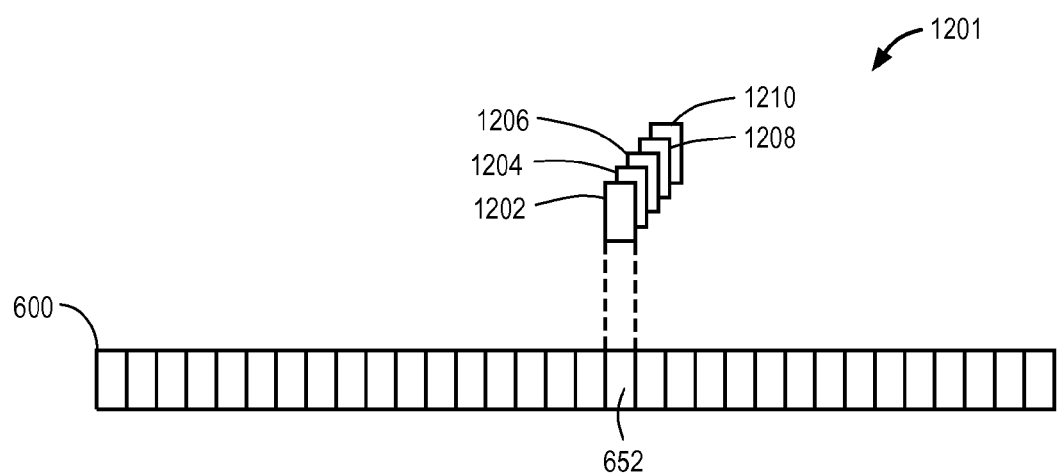
FIG. 12 is an illustrative drawing representing an example ZUI frame sequence produced according to the process of FIG. 11 and inserted in a captured video frame sequence in accordance with some embodiments.

FIG. 12 is an illustrative drawing representing an example ZUI frame sequence 1201 produced according to the process of FIG. 11 and inserted over a selected frame 652 in a captured video frame sequence 600 in accordance with some embodiments. The example ZUI frame sequence 1201 includes five ZUI frames, 1202-1210 that are presented in sequence. In operation, playback of the captured video sequence 600 halts or slows down significantly during the playback of the ZUI frame sequence 1201.

Figure 13:
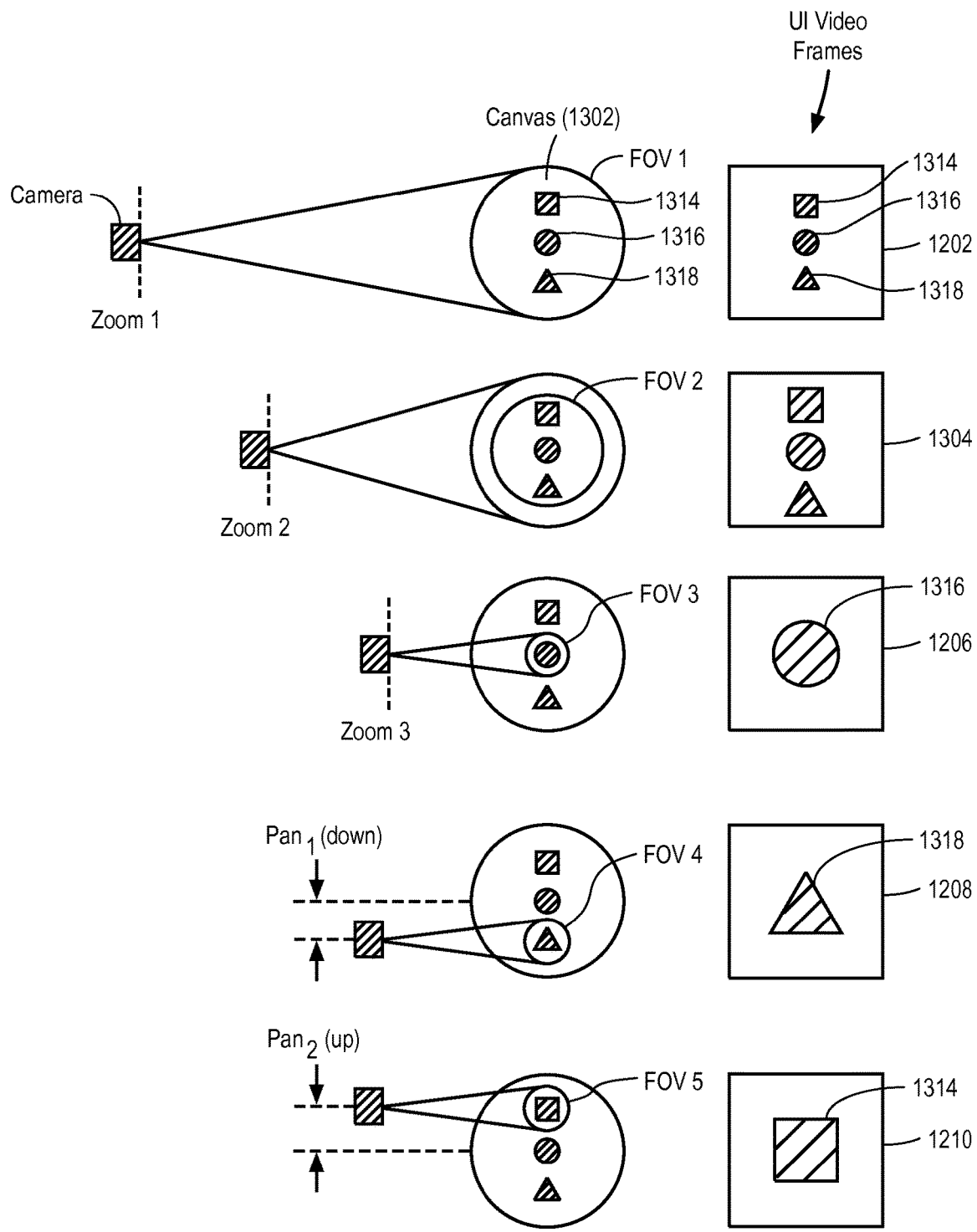
FIG. 13 is an illustrative drawing representing different example virtual camera zooming and panning displays moves in the course of creation of the example five frame ZUI sequence of FIG. 12 in accordance with some embodiments.

FIG. 13 is an illustrative drawing representing different example virtual camera zooming and panning displays moves in the course of creation of the example five frame ZUI sequence 1201 of FIG. 12 in accordance with some embodiments. A ZUI canvas 1312 is shown with three display elements, a square 1314, a circle 1316 and a triangle 1318 arranged on the canvas 1312 as shown. An example first camera position has a first zoom level, Zoom1, and a first field of view (FOV1) that produces the first ZUI frame 1202. An example second camera position has a second zoom level, Zoom2 closer to the canvas relative to Zoom1, and a second field of view (FOV2) that produces a second ZUI frame 1204. An example third camera position has a third zoom level, Zoom3, and a third field of view (FOV3) that produces a third ZUI frame 1206. Zoom3 is zoomed in closer to the canvas relative to Zoom2 that encompasses only the circle 1316 and produces a third ZUI frame 1206. An example fourth camera position has zoom level Zoom3 but is panned upward relative to the third camera position by an amount PAN1 so as to encompass a fourth field of view FOV4 that encompasses only the triangle 1318 and produces a fourth ZUI frame 1208. An example fifth camera position has zoom level Zoom3 but is panned downward relative to the third camera position by an amount PAN2 a fifth field of view FOV5 that encompasses only the square 1314 and that produces a fifth ZUI frame 1210. Thus, it will be appreciated that a user may create a ZUI video display sequence that involves zooming and panning on display elements.

ZUI Insertion

Figure 14:
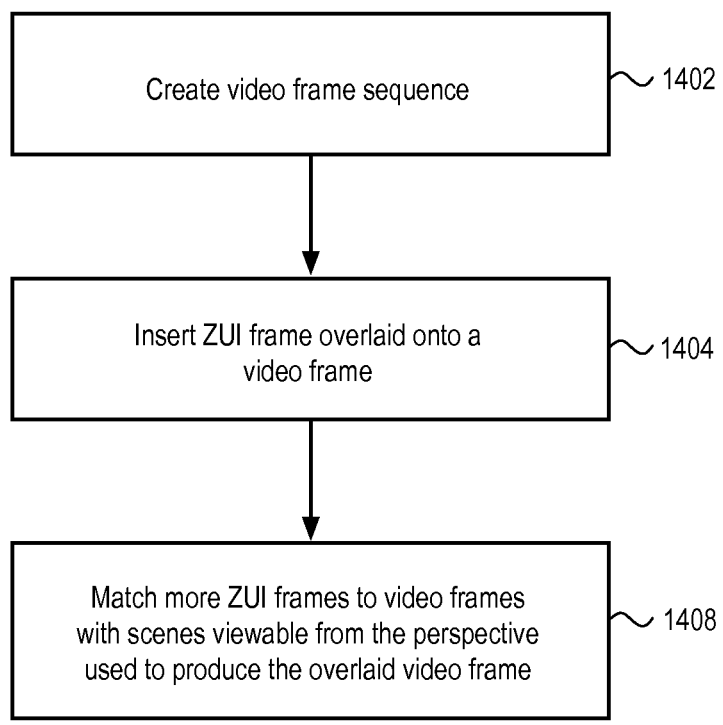
FIG. 14 is an illustrative flow diagram representing a process to produce a composite video frame sequence that includes captured video frames and ZUI video frames in accordance with some embodiments.

FIG. 14 is an illustrative flow diagram representing a process 1400 to produce a composite video frame sequence that includes captured video frames and inserted ZUI video frames in accordance with some embodiments. In block 1402, a user captures a sequence of video frame images from the physical world, such as the video frame sequence captured in relation to the example of FIGS. 3-6. In block 1404, a user provides input user input controls of (not shown) a user device (not shown), such as a mobile device, for example, to overlay a ZUI sequence upon a selected captured video frame. In block 1406, a user also may add telestration images to one or more video frames. In block 1408, a move match process, described below, identifies other captured video frames that match the frame on which a ZUI sequence is overlaid and adds to those other frames, in proper perspective, images that represent the overlaid ZUI frame sequence. Similarly, the move match process identifies other captured video frames that match the frame on which a telestration is overlaid and adds to those other frames, in proper perspective, images that represent the overlaid telestration. It will be appreciated that a user may choose to overlay with ZUI sequences only and to not overlay telestration or may choose to not overlay a ZUI display and to only overlay a telestration. Moreover, the order of adding ZUI displays and telestration is unimportant.

Figure 15:
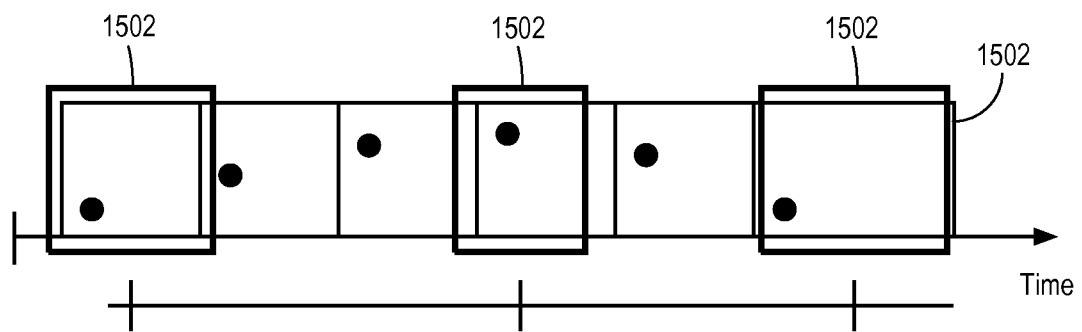
FIGS. 15-16 are illustrative examples of alternative processes for user selection of a captured frame on which to overlay a ZUI sequence in accordance with some embodiments.
Figure 16:
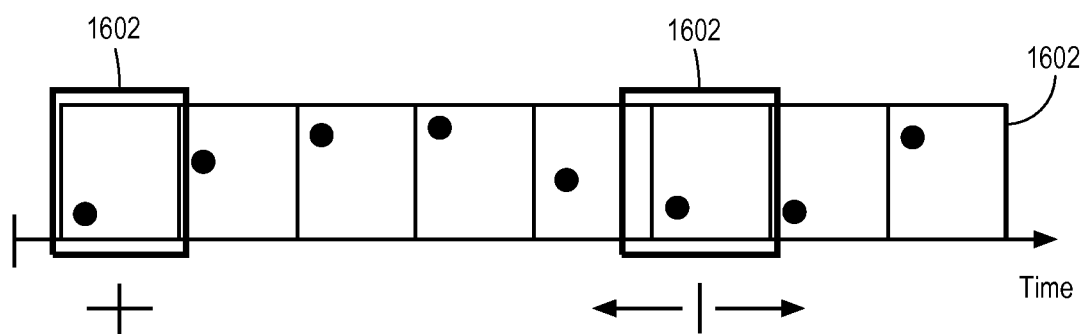

FIGS. 15-16 are illustrative examples of alternative processes for user selection of a captured frame on which to overlay a ZUI sequence in accordance with some embodiments. FIG. 15 shows a sequence of captured video frames 1502 on a time line in which blank or default ZUI frames 1504, e.g., ZUI frames that have not yet had user content added, are arranged automatically at evenly spaced intervals on the available timeline of captured video frames. The dots in different locations of the individual captured frames of the captured frame sequence 1502 represent captured image content. Thus, the overlaid captured frames are selected automatically, and a user need not locate the particular captured frame on which to overlay a ZUI frame sequence. Rather, during ZUI frame sequence creation, a user selects a prearranged ZUI frame location and adds ZUI content, e.g., defines display elements, zooms and pans. The user can delete blank or default ZUI sequences that are unused. FIG. 16 is an illustrative drawing showing a sequence of captured video frames 1602 on a time line in which a user scrolls through the captured video frames to manually select one or more captured frames on which to overlay ZUI frames 1604. The arrows indicate that the user can scroll the captured video frame sequence forward and backward to select a captured frame on which to overlay a ZUI sequence. Once a user selects a frame location, she can add the desired ZUI content as described above.

Match Moving

Figure 17:
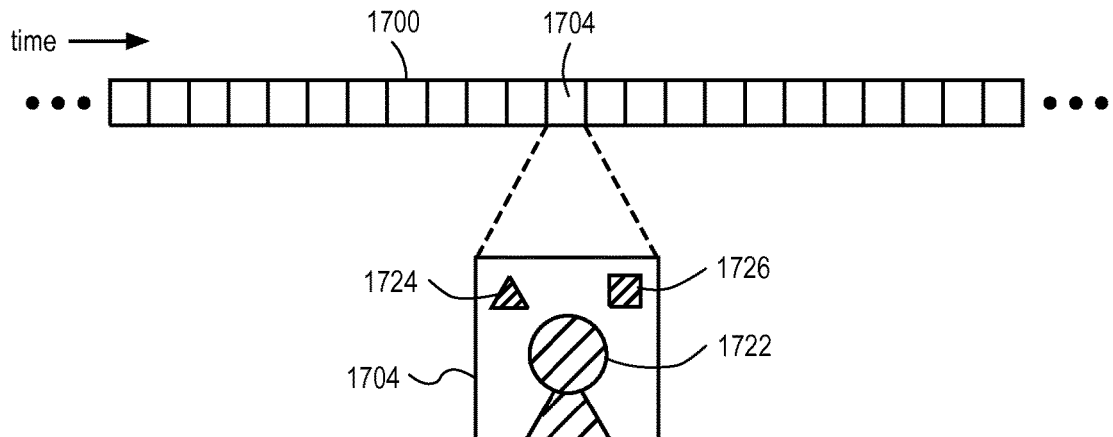
FIGS. 17-19 are illustrative drawings representing a match moving process to add a first ZUI frame representing the ZUI sequence to multiple captured frames having a field of view that encompass at least a portion of the field of view of a selected captured frame in accordance with some embodiments.
Figure 18:
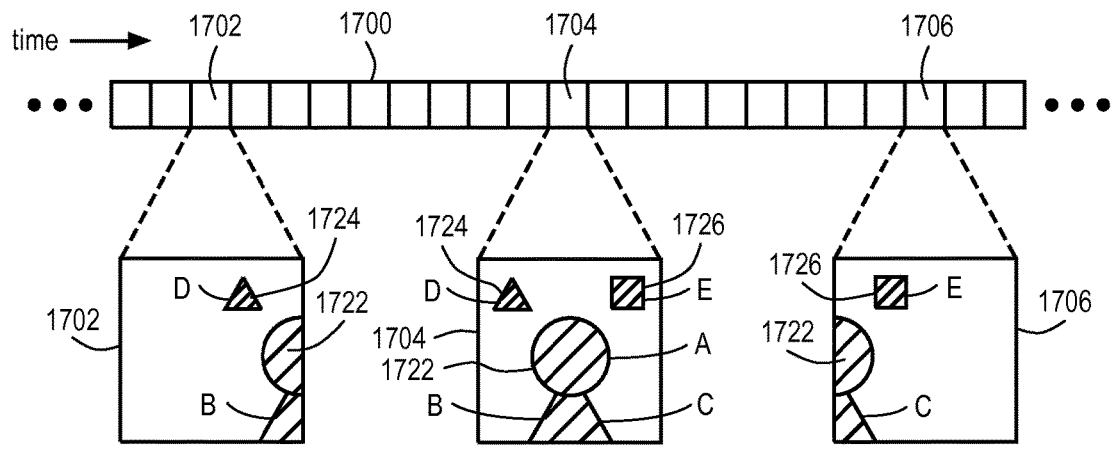
Figure 19:
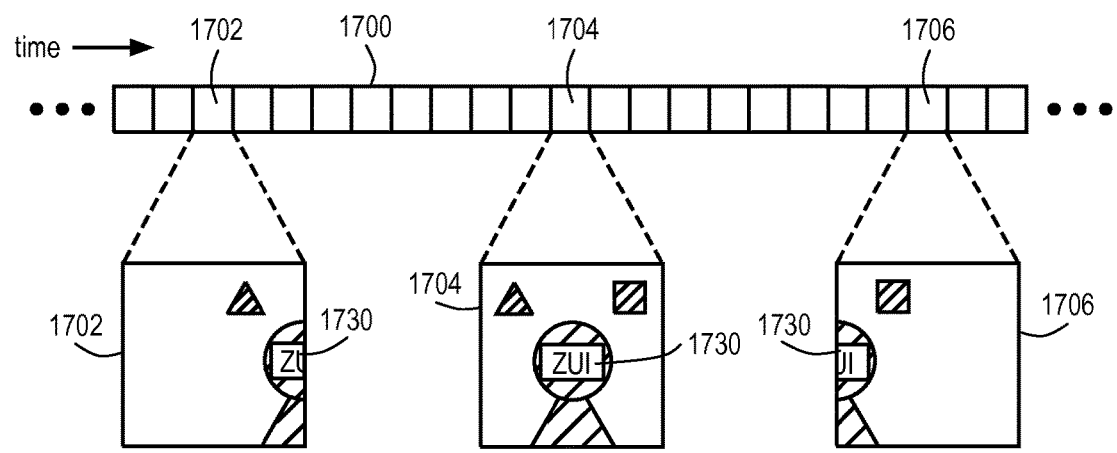

FIGS. 17-19 are illustrative drawings representing a match moving process used to overlay a first ZUI frame, which may be the first frame of a ZUI frame sequence, over multiple captured frames of a captured frame sequence 1700 in accordance with some embodiments. In accordance with some embodiments, a selected captured frame 1704 is selected on which to overlay a ZUI frame. In accordance with some embodiments, the ZUI frame can be a default frame that contains no user content but to which user content can be added later so as to create a ZUI frame sequence. More particularly in accordance with some embodiments, the a ZUI frame is overlaid, using a match moving process, onto portions of multiple frames in a captured video frame sequence to create an impression that the ZUI frame is actually suspended in physical space in the physical world. Match moving is well known to persons of ordinary skill in the art. Tim Dolbert, Matchmoving, The Invisible Art of Camera Tracking, Second Edition, by John Wiley & Sons, Inc. 2103; and Steve Wright, Digital Compositing for Film and Video, Third Edition, Focal Press, 2010, describe match moving techniques, for example.

FIG. 17 shows a captured video frame sequence 700 and shows an expanded view of a selected frame 1704 selected by a user for a ZIU overlay. Assume that the illustrative selected frame 1704 shows an image of a person 1722 and images of first and second additional objects 1724, 1726. FIG. 18 shows the selected frame 1704 and two additional frames 1702 and 1706 that include portions of the images included in 1704. Further assume that a camera (not shown) moved from left to right when capturing the video frame sequence 1700 and that frame 1702 was captured earlier in time than the selected frame 1704 and that frame 1706 was captured later in time than frame 1704.

The match moving process identifies features that are indicative of the selected image. Referring to FIG. 18, assume that the match moving process selects features A-E that are indicative of the selected frame 1704, and matches these features to other frames to locate frames that contain images that at least partially match the selected frame 1704. Referring to FIG. 18, it is assumed that the example earlier frame 1702 and the example later frame 1706 have features that sufficiently match the selected features for the match moving process to declare a match.

FIG. 19 is an illustrative drawing showing the overlay of a ZUI frame 1730 onto Frames 1702, 1704 and 1706. It can be seen that the person 1722 is centered in captured frame 1704, and accordingly, the ZUI frame 1730 is centered in frame 1704 over the image of the person 1722. However, in frame 1702, the person 1722 is only half visible and off to the right side of the frame 1702, and accordingly, the ZUI frame 1730, which is centered over the person 1722, is only partially visible off to the right side of the frame 1702. Conversely, in frame 1706, the person 1722 is only partially visible and off to the left side of the frame, and accordingly, the ZUI frame 1730, which centered over the person 1722, is only partially visible and off to the left side of the frame.

Telestration

As used herein, telestration refers to a process and resulting image in which a user operator draws a sketch, which may be a freehand sketch, over a moving or still video image. Typically, a user draws on a touchscreen with a finger or uses a pen device on a graphics tablet. From the touchscreen or tablet, a drawing signal is communicated to a telestrator device (not shown), which is known and forms no part of the present invention, which overlays a video image with the drawing onto captured video frames and outputs a combined signal for display.

Figure 20:
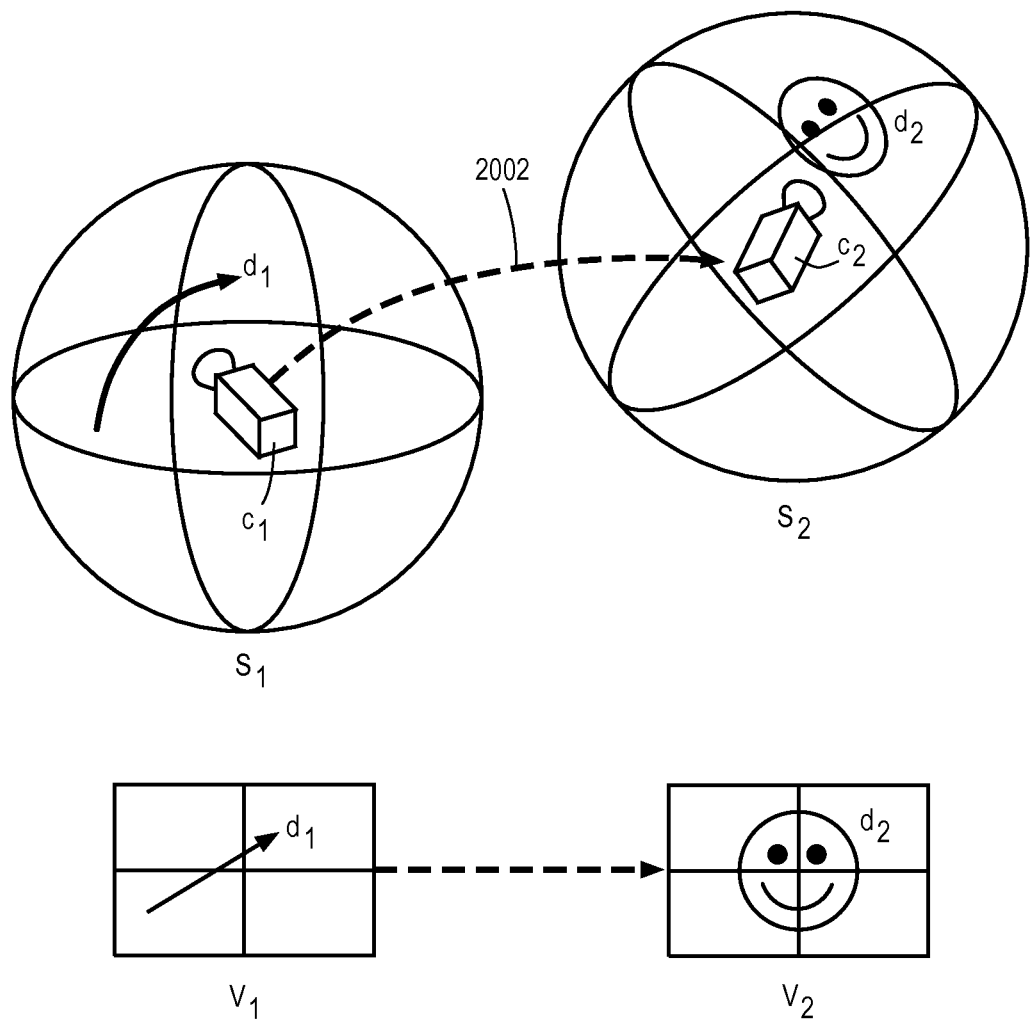
FIG. 20 is an illustrative drawing representing process to capture telestration in accordance with some embodiments.

FIG. 20 is an illustrative drawing representing process to capture telestration in accordance with some embodiments. More, specifically, telestration images are captured on a virtual surface, $S_1$, $S_2$ defined relative to the camera position at selected time and frame on which telestration is added. Camera position $C_{P1}$ is an example first position and orientation of a camera. Camera position $C_{P1}$ is an example second position and orientation of the same camera at a later moment in time. Arrow 2002 represents the path followed by the camera in moving from the first position to the second position. Virtual surfaces $S_1$ and $S_2$ are defined relative to camera position $C_{P1}$ and camera position $C_{P2}$, respectively. In accordance with some embodiments, the virtual surfaces $S_1$ and $S_2$ are spheres centered at $C_{P1}$ and $C_{P2}$. Alternatively, the virtual surfaces can be ellipsoids or curved. Drawing $d_1$ is a telestration drawing created by a user on a frame captured when the camera has the viewing perspective of $C_{P1}$. In operation, a user may halt playback of a captured video frame sequence to annotate a selected frame with the telestration $d_1$. Drawing $d_2$ is a telestration drawing created by a user on a frame captured when the camera has the perspective of $C_{P2}$. In operation, a user may halt playback of a captured video frame sequence to annotate a selected frame with the telestration $d_2$. View $V_1$ is a perspective view of the telestration image $d_1$ overlaid on a captured video frame from the perspective seen from $C_{P1}$. View $V_2$ is a perspective view of the telestration image $d_2$ overlaid on a captured video frame from the perspective seen from $C_{P2}$. As a captured video sequence is played back, the camera perspective appears to move from $C_{P1}$ to $C_{P2}$. It can be seen that the telestration drawings $d_1$, $d_2$ appear to be flat from the perspectives of $C_{P1}$, $C_{r2}$, respectively. During playback, in accordance with some embodiments, the telestration images are overlaid onto additional successive frames of the captured video frame sequence frames through the move matching process described above. However, when the location of the telestration images relative to underlying captured video frame images is defined relative to virtual curvilinear surfaces $S_1$, $S_2$, rather than the linear path followed by the underlying images on which they are overlaid, the telestration images $d_1$, $d_2$ will appear to float in space above the overlaid captured video frame images.

Figure 21:
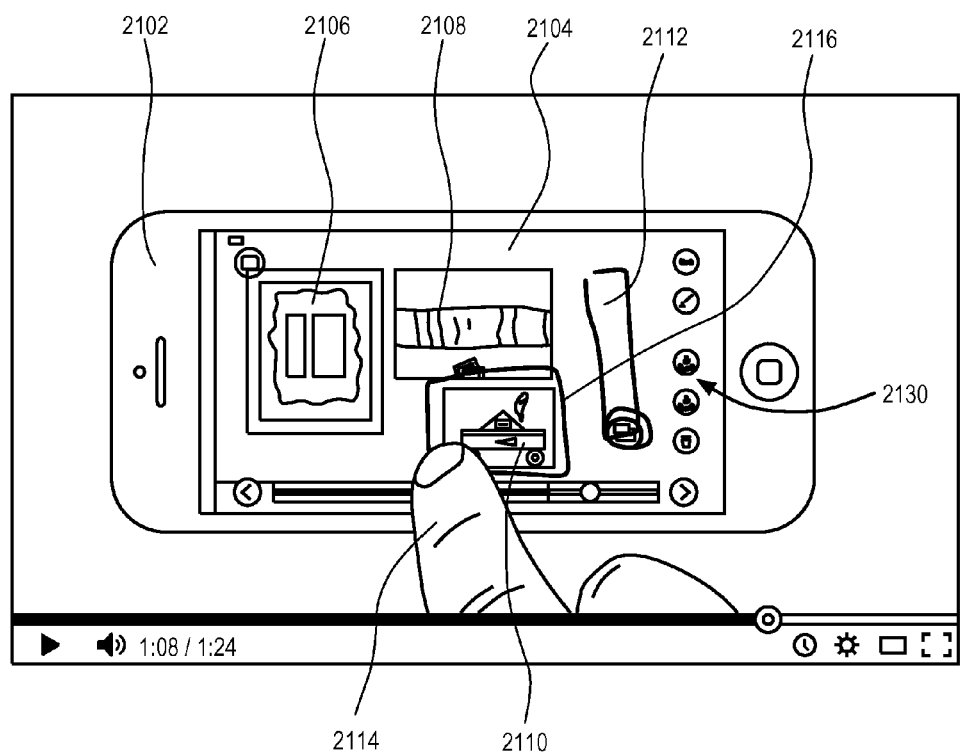
FIGS. 21-23 are illustrative drawings representing telestration images drawn over a captured frame that have been projected onto a curved surface resulting in an impression that the telestration images float above the captured images in accordance with some embodiments.
Figure 22:
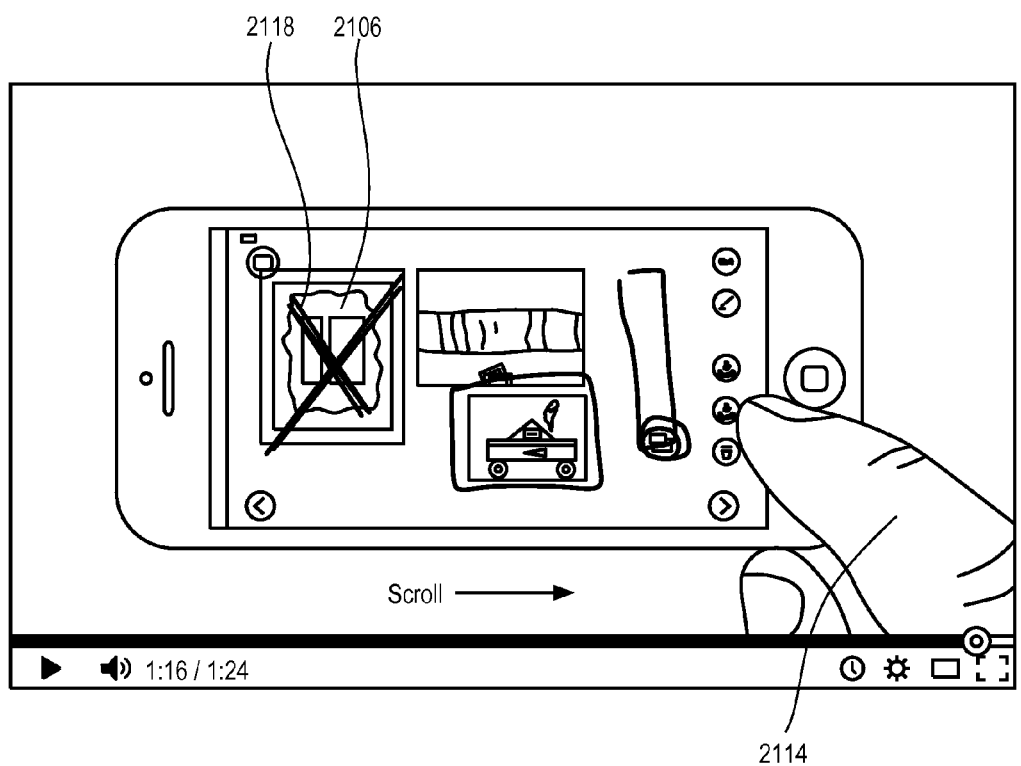
Figure 23:
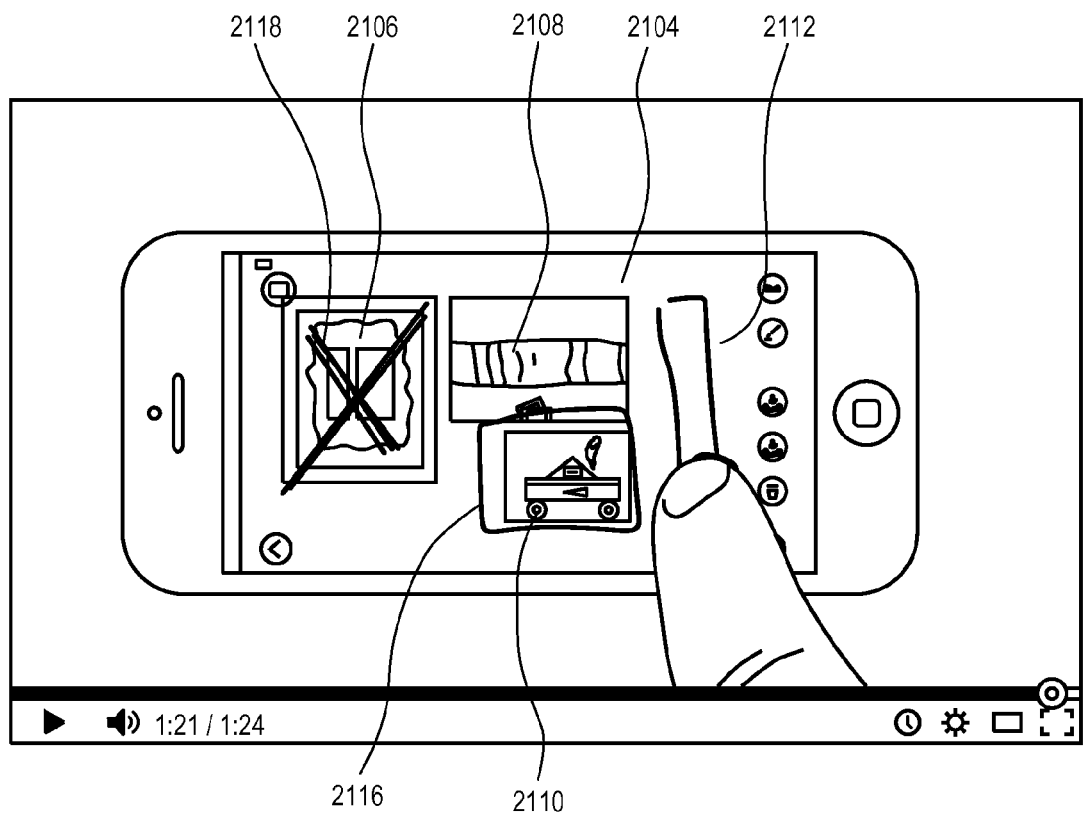

FIGS. 21-23 are illustrative drawings representing a sequence of captured frames onto which telestration images drawn and are projected onto a virtual curved surface (not shown) resulting in an impression that the telestration images float above the captured images in accordance with some embodiments. FIGS. 21-23 show an illustrative electronic device 2922102, e.g., a smartphone, having a display screen 2104 displaying a captured images of a first drawing 2106, a second drawing 2108 and third drawing 2110. FIG. 21 shows a first telestration image 2112, a hand drawn exclamation mark, to the right of the drawings. FIG. 21 also shows a user's finger 2114 creating a second telestration image 2116, a hand drawn rectangle about the third drawing R110. Touch screen UI input controls 2130 that can be used to control telestration insert and ZUI content insert, for example, are shown along the right side of the screen 2104.

FIG. 22 shows the addition of a third telestration image 2118, a hand drawn "X" through the first drawing 2106. The user's finger R114 is shown to the right of the first telestration image, the exclamation point. As explained with reference to FIG. 23, the user's finger 2114 is about to go through a motion that will scroll the displayed drawing images 2106, 2108 and 2110 to the right, as indicated in the right-facing arrow.

FIG. 23 shows the screen display of FIG. 22 scrolled slightly to the right. Although the first, second and third drawing images 2106, 2108 and 2110 have moved to the right on the display screen 2104, the first, second and third telestration images 2112, 2116 and 2118 have not moved to the right by the same amount that the three drawing images 2106, 2108 and 2110 have moved. Since the first, second and third telestration images 2112, 2116 and 2118 are projected onto a curved surface (not shown) that is overlaid onto the captured video frame containing the three drawing images 2106, 2108 and 2110, the relative movement of the telestration images and the video frame images during scrolling of the captured video frame sequence creates a visual impression that the telestration images are floating above the video frame images.

Composite Sequence Playback

Figure 24:
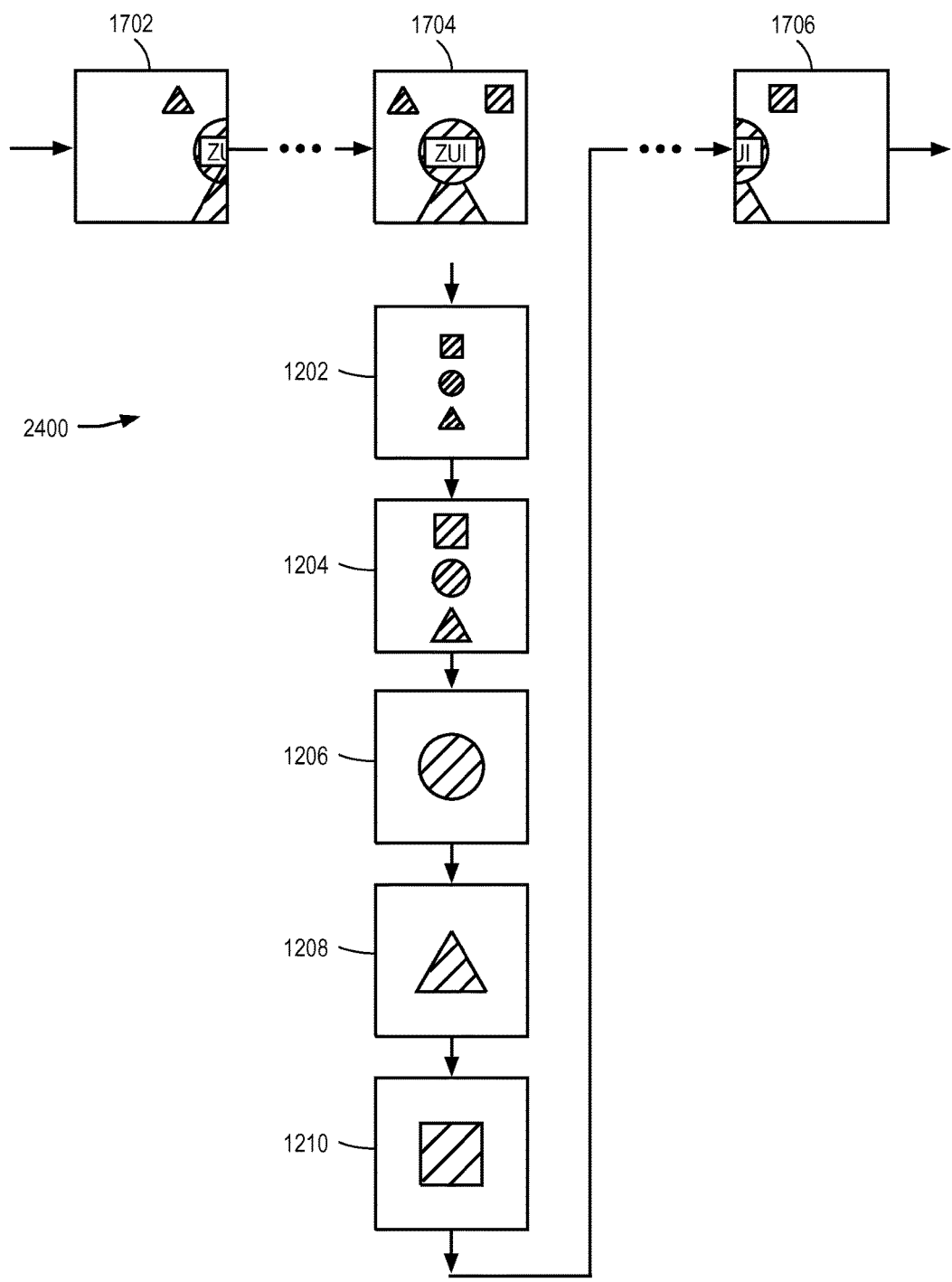
FIG. 24 is an illustrative drawing representing a composite video sequence in which a first ZUI frame is overlaid, at least in part, onto multiple frames in a captured video sequence in accordance with some embodiments.

FIG. 24 is an illustrative drawing representing a composite video sequence 2400 based upon the example captured video sequence of FIGS. 17-19 and the example ZUI sequence of FIGS. 12-13 in accordance with some embodiments. The captured frame sequences plays from left to right. In order to simplify the drawings and the explanation only representative frames 1702, 1704 and 1706 are shown. Frame 1702 is displayed first with only a left side of the ZUI frame visible overlaying a portion of the captured frame 1702. Next, the selected frame 1704 is displayed with the ZUI frame fully visible overlaying a portion of the captured frame 1704 Playback of the captured video frame sequence halts, and a ZUI frame sequences plays with the captured frame 1704 acting as a background. In this example, the ZUI frame sequence of FIGS. 1202-1210 is displayed. As explained below the images on the background frame 1704 may be blurred during zooming during the ZUI sequence. After the ZUI sequence completes, playback of the captured video sequence continues, and the selected frame 1706 is displayed with only a right side of the ZUI frame visible overlaying a portion of the captured frame 1706.

Figure 25:
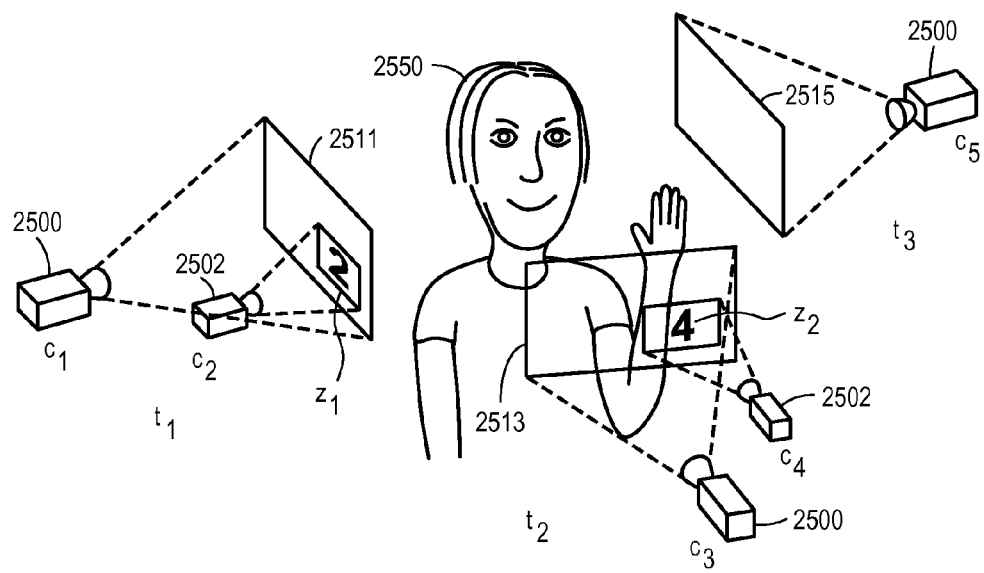
FIGS. 25-26 show reconstructed camera positions (FIG. 25) and corresponding views from these camera positions (FIG. 26) in accordance with some embodiments.
Figure 26:
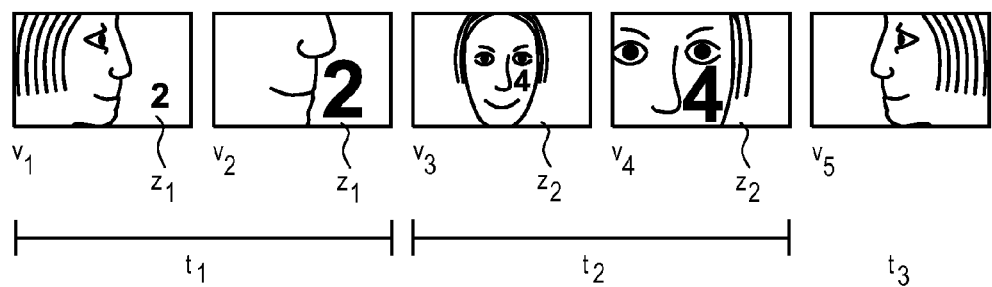

FIG. 25 is an illustrative drawing representing certain example physical camera positions during physical world image capture and representing certain example virtual camera positions corresponding to overlaid ZUI images for a composite video frame display in accordance with some embodiments. The example captured image a physical person. FIG. 26 is an illustrative drawing showing certain example composite video frames during of the composite frame sequence that includes selected captured frames with images of a physical world object ZUI frames overlaid onto them in accordance with some embodiments. It can be seen that in the composite frames in which a ZUI sequence overlays a captured frame, the ZUI frame is partially transparent, and the overlaid captured frame image is partially visible in the background behind the overlaying ZUI.

FIG. 25 shows reconstructed camera positions during physical world image capture and during ZUI display. During capture of the video frame sequence representing the physical scene, a physical camera 2500 moves along a path (not shown) that follows an approximately two-hundred and seventy degree arc about the physical person 2550 that includes physical camera positions $C_1$, $C_3$ and $C_5$. In physical camera position $C_1$, the camera 2500 captures a frame 2511 that includes an image of a right profile view of the person 2550. In physical camera position $C_3$, the camera 2500 captures frame 2513 that includes an image of a frontal view of the person 2550. In physical camera position $C_5$, the camera 2500 captures frame 2515 that includes an image of a left profile view of the person 2550. ZUI frames $Z_1$, $Z_2$ are overlaid onto selected captured frames 2551, 2553. The ZUI frames $Z_1$, $Z_2$ correspond to camera positions C and $C_4$ of a virtual camera 2502 used during ZUI sequence creation in accordance with some embodiments.

FIGS. 25-26 show reconstructed camera positions (FIG. 25) and corresponding views from these camera positions (FIG. 26) in accordance with some embodiments. Times t1, t2 and t3 are the occurrence times of captured frames 2511, 2523 and 2515 in a captured video frame sequence that are captured with the physical camera 2500 in physical camera positions $C_1$, $C_3$ and $C_5$, respectively. The first camera position $C_1$ corresponding to time $t_1$, has a first field of view $V_1$. It can be seen that in the first field of view $V_1$, a selected captured frame 2511 corresponding to time $t_1$ which includes an image of a physical world object, i.e. a right profile view of the person 2550 in this example, is overlaid by a ZUI frame $Z_1$ a visual display element, i.e. the number "2". The second camera position $C_2$, which also corresponds to time $t_1$ of the captured frame sequence and corresponds to a position of the virtual camera 2502, has a second field of view $V_2$. It can be seen that in the second field of view $V_2$, the selected captured frame, 2511, which corresponds to time $t_1$, is overlaid by ZUI frame $Z_1$ that zooms in on certain content of the ZUI frame $Z_1$. More particularly, the virtual camera position $C_2$ is panned and zoomed in to focus on the ZUI content, i.e. to focus on the number "2". It can be seen that as camera position moves between camera position $C_1$ and camera position $C_2$ and zooms in on the ZUI content, it also zooms in on a portion of the captured frame 2511 on which the ZUI frame $Z_1$ is overlaid and which acts as a visible background behind the ZUI frame $Z_1$.

Similarly, the physical camera position $C_3$ corresponding to time $t_2$, has a third field of view $V_3$. It can be seen that in the third field of view $V_3$, a selected captured frame 2513 corresponding to time $t_2$ which includes an image of the front view of the person 2550 in this example, is overlaid by a ZUI $Z_2$ that includes a visual display element, i.e. the number "4". The fourth camera position $C_4$, which also corresponds to time $t_2$ of the captured frame sequence and corresponds to a position of the virtual camera 2502, has a fourth field of view $V_4$. It can be seen that in the fourth field of view $V_4$, the selected captured frame 2513, which corresponds to time $t_2$, is overlaid by ZUI frame $Z_2$ that focuses on certain content. More specifically, the virtual camera position $C_4$ is panned and zoomed in to focus on the number "4". It can be seen that as the camera moves between camera position $C_3$ and camera position $C_4$ and zooms in on the ZUI content, it also zooms in on a portion of the captured frame 2513 on which the ZUI frame $Z_2$ is overlaid and which acts as a visible background behind the ZUI frame $Z_2$.

The fifth physical camera position $C_5$ corresponding to time $t_5$ and captured frame 2515, has a fifth field of view $V_5$. No ZUI frame is overlaid on the captured frame at time $t_5$, which includes an image of the right profile view of the person in this example.

It will be understood that ZUI frames Z1 and Z2 each may represent one frame in a sequence of ZUI frames in which a virtual camera 2502 zooms and pans about a ZUI canvas.

More particularly, during playback as explained above, a captured video frame sequence is played. When the captured video frame playback reaches a selected captured frame on which a ZUI frame sequence has been overlaid, playback of the captured frame sequence halts, and the overlaid video frame sequence plays. When playback of the overlaying ZUI frame sequence is competed, playback of the captured video frame sequence continues. During ZUI frame sequence playback, the overlaid video frame is visible as a background layer of the ZUI frames that may be zoomed and panned in concert with zooming and panning to focus on ZUI content. During zoom ins, the background captured video frame is blurred so as to avoid pixilation while maintaining the impression of three dimensional movement during the ZUI sequence.

Alternatively, rather than halt playback of the captured video frame sequence during ZUI sequence playback, the captured video sequence may be merely slowed down instead. A ZUI display sequence often will be added to a portion of a captured video in essence to annotate the video. In some circumstances, it may be desirable to apply such a ZUI annotation to a slowed down sequence of frames rather than to a single frame, for example. Whether the captured video sequence is halted or merely slowed down, the ZUI sequence is associated with a selected portion of the video. In either case, a three dimensional feel of an overlaid ZUI sequence is enhanced by including one or more selected captured video frames as ZUI frame backgrounds that are zoomed and panned in coordination with zooming and panning of the ZUI sequence.

Figure 27:
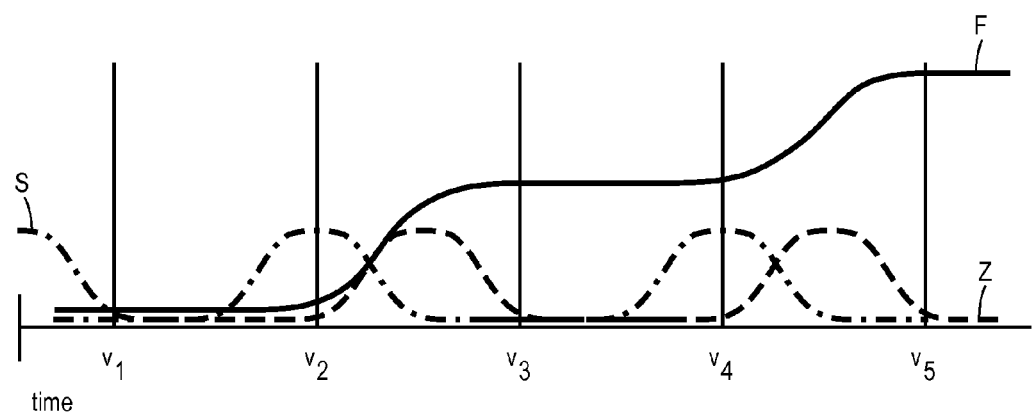
FIG. 27 is an illustrative drawing representing example playback speeds of the captured frames and overlaid ZUI frames during playback of a sequence of views on the composite video of FIGS. 25-26 in accordance with some embodiments.

FIG. 27 is an illustrative drawing representing example playback speeds of the captured frames and overlaid ZUI frames during playback of a sequence of views on the composite video of FIGS. 25-26 in accordance with some embodiments. Playback speed may be measured in frames per second, for example. Curve "S" represents the captured video frames playback speed. Curve "Z" represents the overlaying ZUI video frames playback speed. Curve "F" represents the current captured video frame playback speed.

Curve S illustrates playback of a captured video frame sequence transitioning smoothly between full speed playback, gradually slowing down to a halt for ZUI frame playback, followed by gradually speeding up again to continue playback following completion of the ZUI frame sequence. ZUI frame sequences are played during halts in the captured video playback. Conversely, curve Z illustrates the ZUI frame sequence playback transitioning smoothly between gradually speeding up to full speed playback and gradually slowing down to completion following playback.

More particularly, in the example of FIGS. 25-26, before arrival of captured video frame playback at the first composite view $V_1$, which occurs at time $t_1$ in the captured frame sequence, the captured sequence plays at full speed. However, as it approaches the selected frame at which a ZUI sequence is overlaid, it gradually slows down so as to halt. Playback halts at a frame containing the first view $V_1$, which is a composite video frame that includes an initial ZUI frame $Z_1$, which is overlaid on captured frame showing a right profile view of the example person and which may be the first frame of a first ZUI sequence. During display of the first view $V_1$, playback of the captured frame sequence is halted, and captured frame 2511 with the ZUI frame $Z_1$ is displayed without zoom. Hence, during display of the first composite view $V_1$, the playback rate for both the captured frame sequence and a first ZUI frame sequence, which includes frame $Z_1$. During playback of the first ZUI sequence that includes ZUI frame $Z_1$, the ZUI sequence playback rate gradually increases to full ZUI playback speed such that the first ZUI sequence runs at full playback speed while the second view $V_2$ is displayed. After display of the second composite view V2, the playback rate of the first ZUI sequence $Z_1$ gradually decreases to a halt.

As playback speed of the first ZUI sequence $Z_1$ gradually slows down, playback speed of the captured video sequence gradually speeds up to full speed, and then gradually slows down again and halts when it reaches a frame containing the third view $V_3$, which is a composite video frame that includes an initial ZUI frame $Z_2$ of a second ZUI frame sequence overlaid on captured frame 2513, which displays an image of a front view of the example person 2550. During display of the third view $V_3$, playback of the captured frame sequence is halted, and a second ZUI frame sequence has not yet started. Hence, during playback of the third composite view $V_3$, the playback rate is zero for both the captured frame sequence and a second ZUI frame sequence that includes ZUI frame $Z_2$. During playback of the second ZUI sequence $Z_2$, the ZUI sequence playback rate gradually increases to full ZUI playback speed such that the second ZUI runs at full playback speed while the fourth view $V_4$ is displayed. After display of the fourth composite view $V_4$, the playback rate of the second ZUI sequence gradually decreases to a halt.

Figure 28:
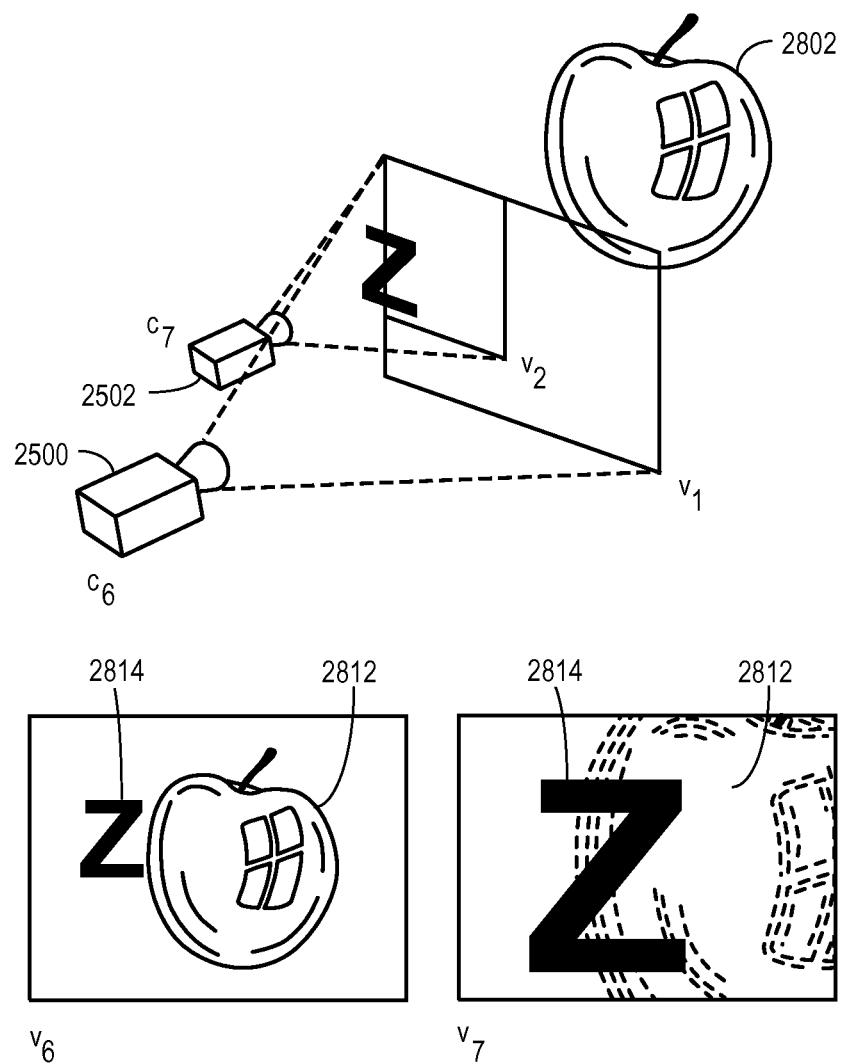
FIG. 28 is illustrative drawing showing two different composite images in which one is not blurred and the other is blurred in accordance with some embodiments.

Curve F represents the current frame from a recorded physical scene being shown. It will be appreciated that the current frame is a different frame in each of times t1, t2 and t3. It is noted that curve F remains substantially flat during display of V1 and V2 and during display of $V_3$ and $V_4$ since animation of these views is achieved through local ZUI pan and zoom. Between display of $V_4$ and $V_5$, curve F changes smoothly, creating a real looking feel as the composite video plays back Blurring Captured Background Frame FIG. 28 is illustrative drawing showing two different composite images in which one is not blurred and the other is blurred in accordance with some embodiments. A real world object 2802, an apple in this example, is within the field of view of a physical camera 2500 at position $C_6$ and is within the field of view of a virtual camera 2502 at position $C_7$. The physical camera position $C_6$ may correspond to an actual physical camera position during capture of a first image $V_6$ of the object. In this example, the first image $V_6$ is a composite image that encompasses an image 2812 of the entire object 2802 plus ZUI content 2814, i.e., the letter "Z". The virtual camera position $C_7$ may correspond to a virtual camera position during zooming and panning in the course of a ZUI frame sequence. The second image $V_6$ encompasses a zoomed-in portion of the captured image 2812, plus zoomed-in ZUI content 2814.

Camera position $C_1$ is disposed further away from the physical object 2800 than camera position $C_2$. From a viewing perspective of the first camera position $C_1$, the first composite image $V_1$ includes a full-size non-blurred captured image 2812 plus overlaid ZUI content 2814. It will be appreciated that an overlaying ZUI frame may include partially transparent layers that permit a portion of the underlying captured image 2812 to be viewed. Thus, in the first composite view $V_6$, a partial clear view of the captured image 2812 can be seen behind the overlaid ZUI content 2814.

The second camera position $C_2$ is panned to the left and slightly upward and zoomed in relative to the first camera position $C_1$. From a viewing perspective of the second camera position $C_7$, the second composite image $V_7$ includes a small zoomed in portion of the captured image 2812 that is blurred, plus a similarly zoomed in overlaying portion of the ZUI content 2814. Thus, in the second composite view V₇, a partial blurred view of the captured image 2812 acts as a background layer that can be seen behind the overlaid ZUI content.

Hardware Embodiment

Figure 29:
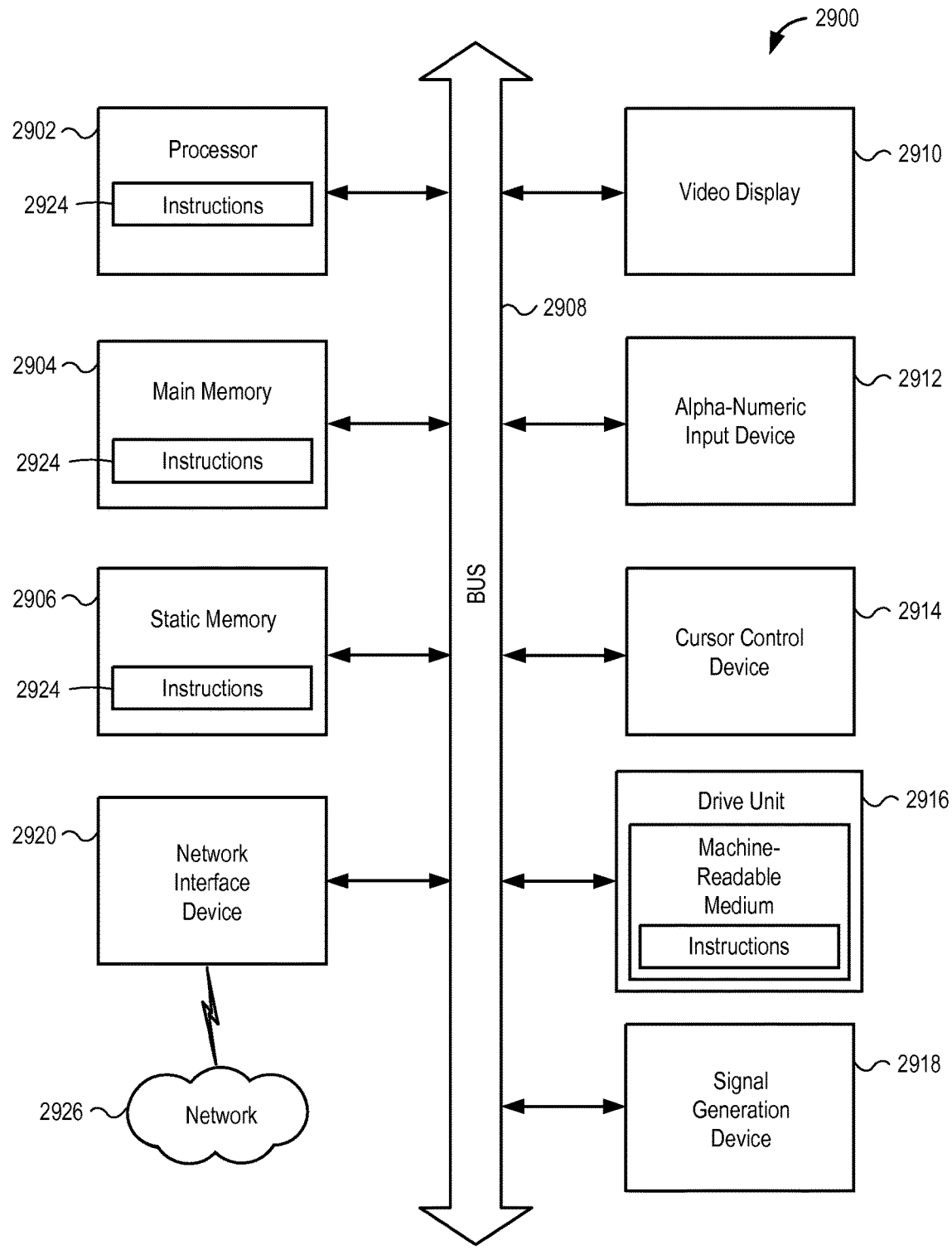
FIG. 29 is a block diagram of a computer processing system within which a set of instructions, for causing the computer to perform any one or more of the methodologies discussed herein, may be executed in accordance with some embodiments.

FIG. 29 is a block diagram of a computer processing system within which a set of instructions, for causing the computer to perform any one or more of the methodologies discussed herein, may be executed. The example computer processing system 2900 includes processor 2922 (e.g., a central processing unit (CPU), a graphics processing unit (GPU) or both), main memory 2904 and static memory 29062906, which communicate with each other via bus 808. The processing system 2900 may further include video display unit 2920 (e.g., a plasma display, a liquid crystal display (LCD) or a cathode ray tube (CRT)). The processing system 2900 also includes alphanumeric input device 2922 (e.g., a keyboard), a user interface (UI) navigation device 2914 (e.g., a mouse, touch screen, or the like), a disk drive unit 2916, a signal generation device 2918 (e.g., a speaker), and a network interface device 2920. The disk drive unit 2926 includes computer-readable storage device 2922 on which is stored one or more sets of instructions and data structures (e.g., software 2924) embodying or utilized by any one or more of the methodologies or functions described herein. The software 2924 may also reside, completely or at least partially, within a computer readable storage device such as the main memory 2904 and/or within the processor 2922 during execution thereof by the processing system 2900, the main memory 2904 and the processor 2922 also constituting computer-readable, tangible media.

While the computer-readable storage device 2922 is shown in an example embodiment to be a single medium, the term "computer-readable storage device" should be taken to include a single medium or multiple media (e.g., a centralized or distributed database, and/or associated caches and servers) that store the one or more sets of instructions. The term "computer-readable storage device" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "computer-readable storage device" shall accordingly be taken to include, but not be limited to, solid-state memories, and optical and magnetic media.

The foregoing description and drawings of embodiments are merely illustrative of the principles of the invention. Various modifications can be made to the embodiments by those skilled in the art without departing from the spirit and scope of the invention, which is defined in the appended claims.

The invention claimed is:

1. A method to display an image frame sequence comprising:
   displaying a first image frame sequence on a display screen; and
   in the course of displaying the first image frame sequence, displaying a zooming user interface (ZUI) content frame sequence on the display screen;
   receiving an indication of amount of camera shaking during capture of at least a portion of the first image frame sequence; and
   in response to a received indication that the camera was shaking by more than a prescribed amount during capture of the at least a portion of the first image frame sequence, speeding up playback speed of the at least a portion of the first image frame sequence to a faster than a normal first image frame sequence playback speed.

2. The method of claim 1, wherein displaying the first image frame sequence includes slowing down a playback speed of the first image frame sequence before playing the ZUI content frame sequence.

3. The method of claim 1, wherein displaying the first image frame sequence includes halting playback of the first image frame sequence before playing the ZUI content frame sequence.

4. The method of claim 1, wherein displaying the first image frame sequence includes slowing down a playback speed of the first image frame sequence before playing the ZUI content frame sequence;
   wherein playing the first image frame sequence includes resuming first image frame playback speed, after playing the ZUI content frame sequence.

5. The method of claim 1, wherein displaying the first image frame sequence includes slowing down a playback speed of the first image frame sequence to a playback speed slower than the normal playback speed, before playing the ZUI content frame sequence;
   wherein playing the first image frame sequence includes increasing playback speed to a speed less than normal playback speed before resuming first image frame playback at the normal playback rate, after playing the ZUI content frame sequence.

6. The method of claim 1, further including:
   displaying a ZUI content frame, from the ZUI content frame sequence, overlaid on multiple frames of the sequence of first image frames.

7. The method of claim 1, further including:
   wherein displaying the ZUI content frame sequence on the display screen includes displaying the ZUI content frame sequence overlaid on a selected frame of the first image frame sequence.

8. The method of claim 1, wherein displaying the ZUI content frame sequence on the display screen includes displaying the ZUI content frame sequence overlaid on a selected image frame of the first image frame sequence; and
   wherein the overlaid selected frame of the first image frame is at least partially visible as a background in the course of the act of displaying the ZUI content frame sequence.

9. The method of claim 1, wherein displaying the ZUI content frame sequence on the display screen includes displaying the ZUI content frame sequence overlaid on a selected image frame of the first image frame sequence;
   wherein the overlaid selected frame of the first image frame is at least partially visible as a background in the course of the act of displaying the ZUI content frame sequence; and
   wherein the overlaid selected frame of the first image frame that is at least partially visible as a background is blurred in the course of the act of displaying the ZUI content frame sequence.

10. The method of claim 1 further including:
   receiving user input to add content to the ZUI content frame.

11. The method of claim 1, wherein displaying the ZUI content frame sequence includes zooming in on a visual display element visible in at least one ZUI content frame of the ZUI content frame sequence; and wherein displaying the ZUI content frame sequence includes blurring an image of a first image frame visible in the course of the act of zooming in on the visual display element.

12. The method of claim 1, wherein displaying the ZUI content frame sequence includes panning across a visual display element visible in at least one ZUI content frame of the ZUI content frame sequence; and
wherein displaying the ZUI content frame sequence includes blurring an image of a first image frame visible in the course of the act panning across the visual display element.

13. The method of claim 1 further including:
in the course of displaying the first image frame sequence, displaying a telestration content frame sequence on the display screen.

14. The method of claim 1 further including:
in the course of displaying the first image frame sequence, displaying a telestration projected on a virtual curved surface that overlays a image displayed within a second selected image frame of the first image frame sequence.

15. The method of claim 1, wherein the image frames include video frames.

16. A method to display an image frame sequence comprising:
displaying a first image frame sequence on a display screen; and
in the course of displaying the first image frame sequence, displaying a zooming user interface (ZUI) content frame sequence on the display screen;
wherein displaying the ZUI content frame sequence on the display screen includes displaying the ZUI content frame sequence overlaid on a selected image frame of the first image frame sequence; and
further including:
match moving a ZUI content frame from the ZUI content frame sequence to one or more other first image frames of the first image frame sequence that have features in common with the selected image frame;
wherein match moving includes:
selecting multiple features from within the selected frame;
matching the selected features to features within multiple frames of the sequence of first image frames to locate frames of the sequence that contain one or more features in common that at least partially match one or more of the selected features; and
overlaying at least a portion of the ZUI content frame onto at least a portion of one or more of the features in common within multiple ones of the located frames.

17. A method to display an image frame sequence comprising:
displaying a first image frame sequence on a display screen; and
in the course of displaying the first image frame sequence, displaying a zooming user interface (ZUI) content frame sequence on the display screen;
receiving user input to associate a telestration with a user selected image frame of the first image frame sequence;
projecting the received telestration on a virtual curved surface that overlays the user selected frame;
match moving the projected telestration to a sequence of additional image frames of the first image frame sequence, that have features in common with the user selected frame;
wherein match moving includes:
selecting multiple features from within the selected frame;
matching the selected features to features within multiple frames of the sequence of first image frames to locate frames of the sequence that contain one or more features in common that at least partially match one or more of the selected features; and
overlaying at least a portion of the telestration onto at least a portion of one or more features in common within each of multiple ones of the located frames; and further including:
displaying the user selected frame together with the projected telestration overlaid on the virtual curved surface; and
displaying the sequence of additional frames together with the overlaid at least a portion of the projected telestration.

18. The method of claim 17, further including:
capturing the first sequence of image frames;
wherein capturing the first sequence of image frames includes using a camera to capture physical world images; and
further including:
determining an amount of camera shaking during the act of capturing.

19. A method to display an image frame sequence comprising:
displaying a first image frame sequence on a display screen; and
in the course of displaying the first image frame sequence, displaying a zooming user interface (ZUI) content frame sequence on the display screen;
using a camera to capture the first sequence of image frames;
determining an amount of camera shaking during the act of capturing; and
in response to a determination that the camera was shaking by more than a prescribed amount during capture of the at least a portion of the first image frame sequence, speeding up playback speed of the at least a portion of the first image frame sequence to a faster than a normal first image frame sequence playback speed.

20. The method of claim 19, further including:
automatically selecting a image frame of the first image frame sequence.

21. A method to display an image frame sequence comprising:
displaying a first image frame sequence on a display screen;
in the course of displaying the first image frame sequence, displaying a zooming user interface (ZUI) content frame sequence on the display screen;
automatically selecting a image frame of the first image frame sequence;
displaying a ZUI content frame, from the ZUI content frame sequence, overlaid on the selected image frame of the first image frame sequence;
receiving user input to select a different frame of the first image frame sequence;
receiving user input to add content to the ZUI content frame;
displaying the ZUI content frame, from the ZUI content frame sequence, overlaid on the selected different image frame of the first image frame sequence;
match moving the ZUI content frame, from the ZUI content frame sequence, to one or more other image frames of the first image frame sequence that have features in common with the selected different image frame;
wherein match moving includes:
selecting multiple features from within the selected frame;
matching the selected features to features within multiple frames of the sequence of first image frames to locate frames of the sequence that contain one or more features in common that at least partially match one or more of the selected features; and
overlaying at least a portion of the ZUI content frame onto at least a portion of one or more of the features in common within multiple ones of the located frames.

* * * * *

UNITED STATES PATENT AND TRADEMARK OFFICE
CERTIFICATE OF CORRECTION

PATENT NO. : 9,703,446 B2
APPLICATION NO. : 14/535482
DATED : July 11, 2017
INVENTOR(S) : Somlai-Fisher et al.

Page 1 of 1

It is certified that error appears in the above-identified patent and that said Letters Patent is hereby corrected as shown below:

On the Title Page

In Column 2, under "Other Publications", Line 1, delete "Bowel"," and insert --Bowl",-- therefor Signed and Sealed this
Tenth Day of April, 2018

Andrei Iancu
*Director of the United States Patent and Trademark Office*